(12) United States Patent
Li et al.

(10) Patent No.: US 9,638,243 B2
(45) Date of Patent: May 2, 2017

(54) JOINT DEVICE

(71) Applicants: Jian-Qun Li, Guangdong (CN);
Xiaosong Duan, Guangdong (CN)

(72) Inventors: Jian-Qun Li, Guangdong (CN);
Xiaosong Duan, Guangdong (CN)

(73) Assignee: Wonderland Nurserygoods Company Limited, NT (HK)

( * ) Notice: Subject to any disclaimer, the term of this patent is extended or adjusted under 35 U.S.C. 154(b) by 580 days.

(21) Appl. No.: 14/011,778

(22) Filed: Aug. 28, 2013

(65) Prior Publication Data

US 2014/0064829 A1    Mar. 6, 2014

(30) Foreign Application Priority Data

Aug. 30, 2012 (CN) ............ 2012 1 0315969
Jul. 23, 2013 (CN) ............ 2013 1 0311958

(51) Int. Cl.
*F16C 11/00* (2006.01)
*F16C 11/10* (2006.01)
*B62B 7/08* (2006.01)

(52) U.S. Cl.
CPC ............... *F16C 11/10* (2013.01); *B62B 7/08* (2013.01); *B62B 2205/20* (2013.01); *Y10T 403/32237* (2015.01)

(58) Field of Classification Search
CPC ..... Y10T 403/32237; Y10T 403/32409; F16C 11/10; B62B 2205/20; B62B 7/08; B62B 7/062

See application file for complete search history.

(56) References Cited

U.S. PATENT DOCUMENTS

| | | | | |
|---|---|---|---|---|
| 4,111,217 A | * | 9/1978 | Victor | E04H 15/60 135/114 |
| 4,191,397 A | * | 3/1980 | Kassai | B62B 7/062 280/647 |
| 4,216,974 A | * | 8/1980 | Kassai | B62B 7/062 280/42 |
| 4,819,958 A | * | 4/1989 | Perego | B62B 7/08 280/644 |

(Continued)

FOREIGN PATENT DOCUMENTS

| | | | |
|---|---|---|---|
| CN | 102211605 A | 10/2011 | |
| DE | 202011052084 U1 | * 12/2011 | ............ B62B 7/008 |

(Continued)

*Primary Examiner* — Josh Skroupa
*Assistant Examiner* — Matthew R McMahon
(74) *Attorney, Agent, or Firm* — Winston Hsu; Scott Margo

(57) ABSTRACT

A joint device includes a first latch, an actuating mechanism, and two connection parts pivotally connected to each other. The first latch is selectively moved to a first locking position for locking the two connection parts or a first unlocking position for unlocking the two connection parts. The actuating mechanism is disposed adjacent to where the two connection parts are pivotally connected. The actuating mechanism is connected to the first latch to be operable to selectively move the first latch to the first locking position or the first unlocking position, and it facilitates operation of unfolding and folding a stroller equipped with the joint device of the invention.

25 Claims, 37 Drawing Sheets

(56) References Cited

U.S. PATENT DOCUMENTS

| | | | | |
|---|---|---|---|---|
| 4,826,348 A * | 5/1989 | Brightman | ............... | F16B 1/00 256/25 |
| 4,834,403 A * | 5/1989 | Yanus | ................. | B60N 2/2848 188/20 |
| 5,454,584 A * | 10/1995 | Haut | ................. | B62B 7/08 280/642 |
| 5,634,654 A * | 6/1997 | Lin | ................. | B62B 7/06 280/47.38 |
| 6,068,284 A * | 5/2000 | Kakuda | ................. | B62B 9/20 280/642 |
| 6,155,740 A * | 12/2000 | Hartenstine | ................. | B62B 7/08 280/38 |
| 6,467,986 B2 * | 10/2002 | Feng | ................. | G05G 5/06 280/87.041 |
| 6,860,504 B2 * | 3/2005 | Suga | ................. | B62B 7/08 280/642 |
| 7,188,858 B2 * | 3/2007 | Hartenstine | ................. | B62B 7/083 280/642 |
| 7,422,230 B2 * | 9/2008 | Chuan | ................. | B62B 7/08 280/642 |
| 7,543,840 B2 * | 6/2009 | Lin | ................. | B62B 3/02 280/38 |
| 7,712,765 B2 * | 5/2010 | Chen | ................. | B62B 9/20 280/642 |
| 8,061,732 B2 * | 11/2011 | Song | ................. | B62B 7/08 280/639 |
| 8,157,286 B2 * | 4/2012 | Lai | ................. | B62B 7/08 280/639 |
| 8,474,836 B2 * | 7/2013 | Yang | ................. | B62B 9/206 280/47.371 |
| 8,474,854 B2 * | 7/2013 | Dean | ................. | B62B 7/08 280/47.38 |
| 8,979,114 B2 * | 3/2015 | Cheng | ................. | B62B 7/062 280/642 |
| 2005/0023799 A1 * | 2/2005 | Lin | ................. | B62B 1/045 280/641 |
| 2006/0237949 A1 * | 10/2006 | Hou | ................. | B62B 7/08 280/642 |
| 2010/0244408 A1 * | 9/2010 | Dean | ................. | B62B 7/08 280/647 |
| 2012/0223508 A1 * | 9/2012 | Ohnishi | ................. | B62B 7/066 280/642 |

FOREIGN PATENT DOCUMENTS

| | | |
|---|---|---|
| TW | 250041 | 6/1995 |
| TW | 298920 | 2/1997 |
| TW | M276762 | 10/2005 |
| TW | 201010894 | 3/2010 |
| TW | I352032 | 11/2011 |
| TW | 201210542 | 3/2012 |
| TW | M425077 | 3/2012 |

* cited by examiner

JOINT DEVICE

BACKGROUND OF THE INVENTION

1. Field of the Invention

The invention relates to an infant carriage, and especially relates to a joint device facilitating operation of folding and unfolding an infant carriage.

2. Description of the Prior Art

As the society continuously progresses, the economy continuously develops, and the scientific technology continuously improves, various consumer goods are provided for people for improving the living standard of people. Therein, strollers are one kind of the various consumer goods.

As everyone knows, for parents having infants, when going outside with an infant for shopping or taking a walk, they brings the infant by a stroller instead of holding the infant in the arms for reducing the loading on themselves. Therefore, strollers are more and more popular to people.

However, in general, conventional strollers cannot be folded. Some of them are huger and occupy larger area. Especially for a smaller living place, occupation of a larger area usually affects movement of people living therein. It is quite inconvenient. In addition, such features of the conventional strollers affect the storage and transport of the stroller.

Therefore, it is needed to offer a technique solution for overcoming the above problem.

SUMMARY OF THE INVENTION

An objective of the invention is to provide a joint device, which facilitates operation of folding and unfolding a stroller and whose structure is simple.

For achievement of the above objective, the invention provides a joint device. The joint device includes a first latch, an actuating mechanism, and two connection parts pivotally connected to each other. The first latch is capable of being selectively moved to a first locking position for locking the two connection parts or a first unlocking position for unlocking the two connection parts. The actuating mechanism is disposed adjacent to where the two connection parts are pivotally connected. The actuating mechanism is connected to the first latch to be operable to selectively move the first latch to the first locking position or the first unlocking position.

Preferably, one of the two connection parts has a pivot hole. The other one of the two connection parts has a pivot shaft inserted into the pivot hole.

Preferably, each of the two connection parts has a first convex tooth. The first latch has a second convex tooth corresponding to the first convex tooth.

Preferably, one of the two connection parts has a first engaging slot. The first latch is inserted into the first engaging slot.

Preferably, a first pivotal plane is formed between the two connection parts. A movement direction of the first latch intersects the first pivotal plane.

Preferably, a first pivotal axis is formed between the two connection parts. A movement direction of the first latch is parallel to the first pivotal axis.

Preferably, the movement direction of the first latch aligns with the first pivotal axis.

Preferably, when the first latch is located at the first locking position, the first latch is engaged with the two connection parts.

Preferably, when the first latch is located at the first locking position, one of the two connection parts is held between the first latch and the other one of the two connection parts.

Preferably, when the first latch is located at the first unlocking position, the first latch is disengaged from one of the two connection parts.

Preferably, the actuating mechanism includes a first resilient part urging against the first latch. The first resilient part pushes the first latch so that the first latch has a tendency to move to the first locking position.

Preferably, the actuating mechanism further includes a first pushing part. The first pushing part is operable to push the first latch so that the first latch moves to the first unlocking position.

Preferably, the actuating mechanism further includes a first button component connected to the first latch. The first button component includes a first button and a first linking part connected to the first button. The first button is capable of being pressed to drive the first linking part to pull the first latch.

Preferably, the actuating mechanism further includes a first button component connected to the first pushing part. The first button component includes a first button and a first linking part connecting the first button and the first pushing part. The first button is capable of being pressed to drive the first linking part to pull the first pushing part so that the first pushing part slides to push the first latch.

Preferably, the joint device of the invention further includes a supporting part fixedly connected to one of the two connection parts. The first button is movably disposed on the supporting part and includes a first button driving part. The first linking part includes a first linking follower in coordination with the first button driving part.

Preferably, the joint device of the invention further includes a supporting part fixedly connected to one of the two connection parts. The first pushing part is slidably connected to the supporting part. A movement direction of the first pushing part is parallel to a movement direction of the first latch.

Preferably, one of the first pushing part and the supporting part has a guiding slot. The other one of the first pushing part and the supporting part has a guiding post slidably connected to the guiding slot. An extension direction the guiding slot is parallel to the movement direction of the first latch.

Preferably, the actuating mechanism further includes an operation part pivotally connected to the supporting part. The operation part includes an operation driving part. The first pushing part includes a pushing follower in coordination with the operation driving part. The operation driving part is capable of rotating to drive the pushing follower to move so that the first pushing part slides to push the first latch.

Preferably, the joint device of the invention further includes a second latch capable of being selectively moved to a second locking position of locking one of the two connection parts and the operation part or a second unlocking position of unlocking one of the two connection parts and the operation part.

Preferably, one of the two connection parts has a second engaging slot. The second latch is inserted into the second engaging slot.

Preferably, a second pivotal plane is formed between the supporting part and the operation part. A movement direction of the second latch intersects the second pivotal plane.

Preferably, a second pivotal axis is formed between the supporting part and the operation part. A movement direction of the second latch is parallel to the second pivotal axis.

Preferably, when the second latch is located at the second locking position, the second latch is engaged with one of the two connection parts and the operation part. When the second latch is located at the second unlocking position, the second latch is disengaged from one of the two connection parts.

Preferably, the actuating mechanism further includes a second resilient part urging against the second latch. The second resilient part pushes the second latch so that the second latch has a tendency to move to the second locking position.

Preferably, the actuating mechanism further includes a second pushing part. The second pushing part is operable to push the second latch so that the second latch moves to the second unlocking position.

Preferably, the actuating mechanism further includes a second button component connected to the second pushing part. The second button component includes a second button and a second linking part connecting the second button and the second pushing part. The second button is capable of being pressed to drive the second linking part to pull the second pushing part so that the second pushing part slides to push the second latch.

Preferably, the actuating mechanism further includes a second button component connected to the second latch. The second button component includes a second button and a second linking part connected to the second button. The second button is capable of being pressed to drive the second linking part to pull the second latch.

Preferably, the second button is movably disposed on the operation part and includes a second button driving part. The second linking part includes a second linking follower in coordination with the second button driving part. The second button driving part is capable of being pressed to drive the second linking follower.

Because the first latch of the invention is selectively moved to a first locking position for locking the two connection parts or a first unlocking position for unlocking the two connection parts. The actuating mechanism is disposed adjacent to where the two connection parts are pivotally connected. The actuating mechanism is connected to the first latch to be operable to selectively move the first latch to the first locking position or the first unlocking position. So when the two connection parts which are locked are required to be rotated, it is practicable to move the first latch to the first unlocking position. When the two connection parts after rotated are required to be locked, it is practicable to move the first latch to the first locking position. Therefore, the joint device of the invention facilitates operation of folding and unfolding a stroller and has an advantage of simple structure.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
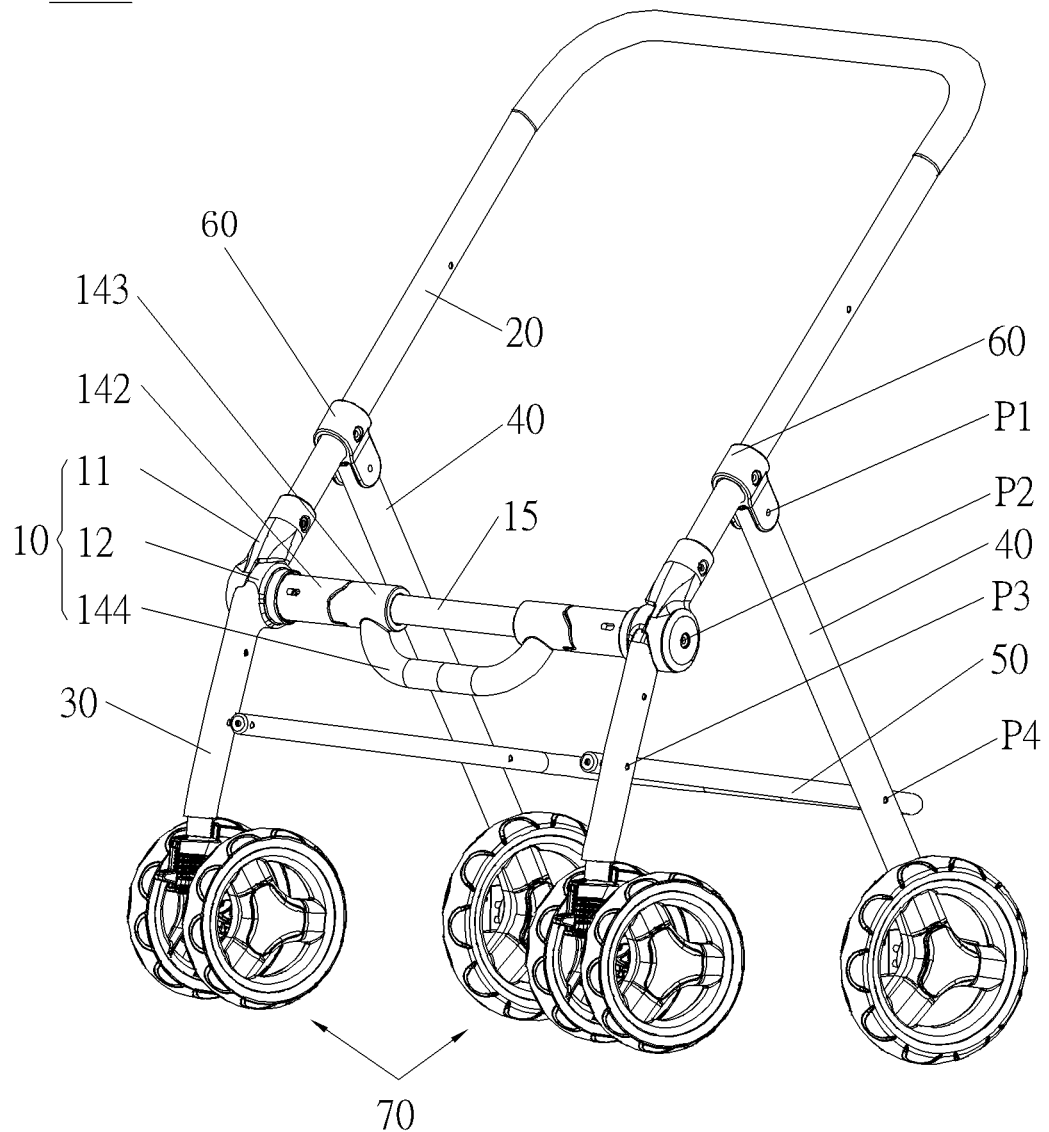
FIG. 1 is a perspective view of a stroller which is equipped with two joint devices of a first embodiment according to the invention and is unfolded completely with the joint devices being at a locking status.
Figure 2:
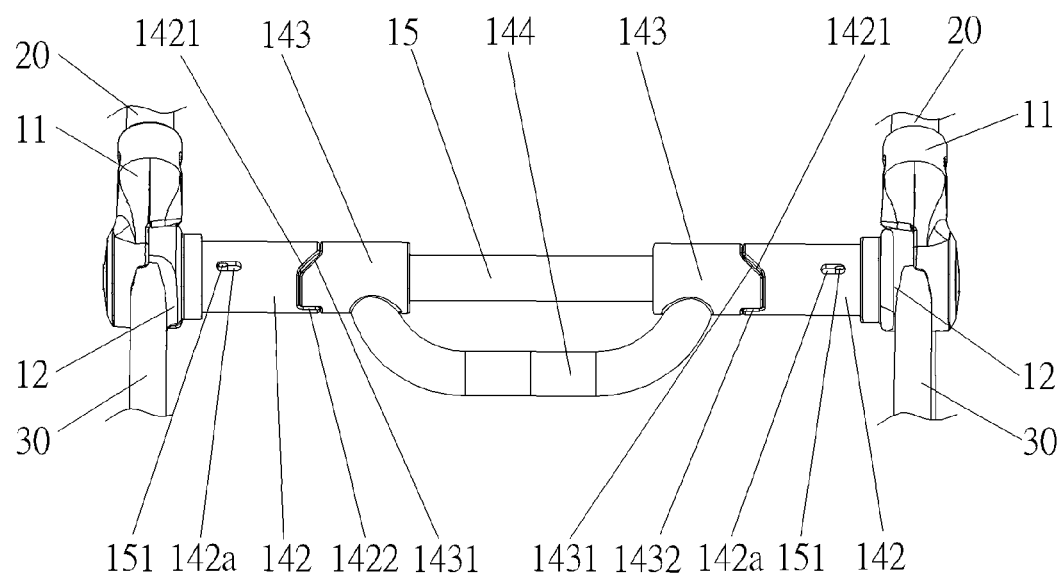
FIG. 2 is a front view of the joint device of the first embodiment according to the invention.

Please refer to FIG. 1, which illustrates a stroller 100 equipped with two joint devices 10 of a first embodiment according to the invention. The stroller 100 includes a stroller handle 20, two supporting legs 30 capable of pivoting relative to the stroller handle 20, and the joint device 10 of the embodiment. In practice, the stroller 100 further includes two supporting legs 40, capable of pivoting relative to the stroller handle 20, and a bottom frame 50, pivotally connected to the supporting legs 30 and the supporting legs 40. Therein, the supporting leg 40 is pivotally connected to the stroller handle 20 through a pivotal connection part 60. An upper portion of the pivotal connection part 60 is sleeved on the stroller handle 20 and fixed on the stroller handle 20, and a lower portion of the pivotal connection part 60 is pivotally connected to the supporting leg 40 where a pivotal connection point P1 is formed, so as to pivotally connect the stroller handle 20 and the supporting leg 40 and provide required space for pivotal rotation of the stroller handle 20 and the supporting leg 40. The bottom frame 50 is disposed to be slanted up and down. Two upper end portions of the bottom frame 50 are pivotally connected to the two supporting legs 30 respectively where two pivotal connection points P3 are formed respectively. A lower end portion of the bottom frame 50 is pivotally connected to the supporting legs 40 where two pivotal connection points P4 are formed respectively. When the stroller 100 of the embodiment is unfolded completely, the pivotal connection point P3 is located between the pivotal connection point P4 and the pivotal connection point P1 in a height direction, and the pivotal connection point P3 is located in front of the pivotal connection point P1 and the pivotal connection point P4, so as to facilitate folding each other of the stroller handle 20, the supporting legs 30, the supporting legs 40, and the bottom frame 50. For easy movement of the stroller 100, the stroller 100 is equipped further with wheel assemblies 70. The wheel assemblies 70 are disposed on the supporting legs 30 and the supporting legs 40. The stroller 100 will be described in detail in the following.

Please refer to FIGS. 1 through 9. The joint device 10 of the embodiment is used for selectively locking or unlocking the pivotal rotation of the stroller handle 20 and the supporting leg 40 for allowing or not allowing the folding and unfolding of the stroller 100. Therein, the joint device 10 of the embodiment includes a first latch 13, an actuating mechanism 14, and two connection parts 11 and 12 pivotally connected to each other. For convenience in description, the two connection parts 11 and 12 are assigned to be a first connection part 11 and a second connection part 12 respectively.

In practice, in the embodiment, the first connection part 11 is disposed on the stroller handle 20; preferably, the first connection part 11 is disposed by a fixed insertion engagement with the stroller handle 20 for facilitating attachment and detachment of the first connection part 11 and the stroller handle 20. Certainly, in other embodiments, the first connection part 11 can be alternatively disposed on the supporting leg 30 by a practical requirement, which will not be described herein repeatedly.

Figure 7:
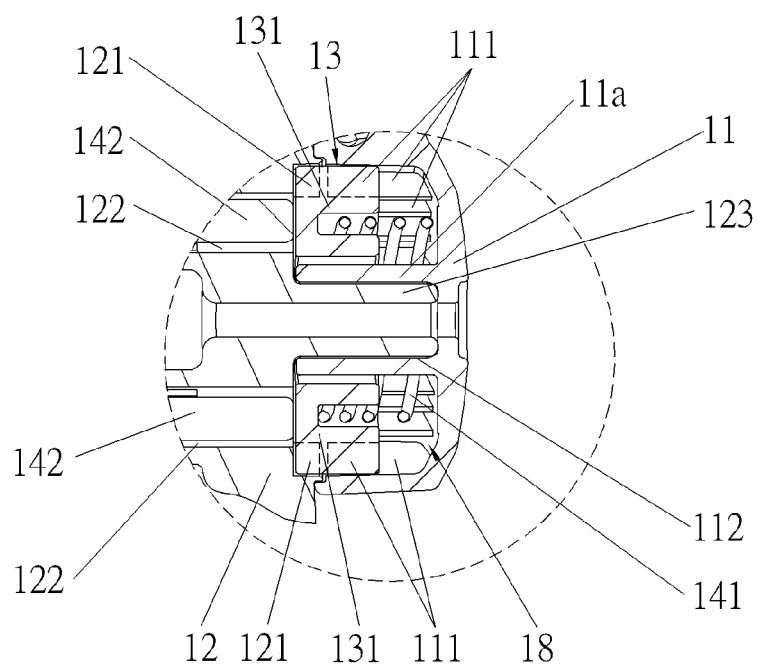
FIG. 7 is an enlarged view of the E portion in FIG. 6.
Figure 8:
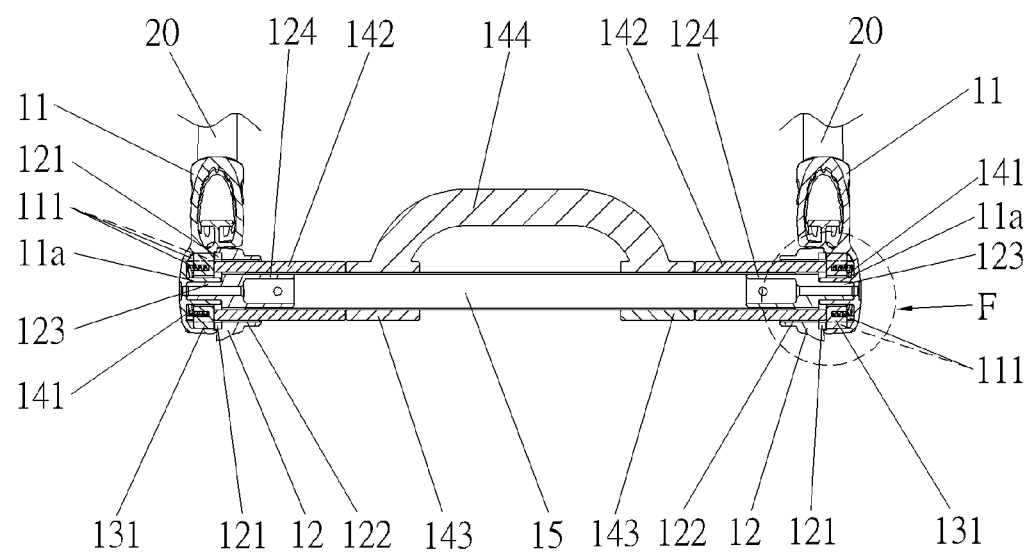
FIG. 8 is a sectional view of the joint device at an unlocking status of the first embodiment according to the invention.
Figure 9:
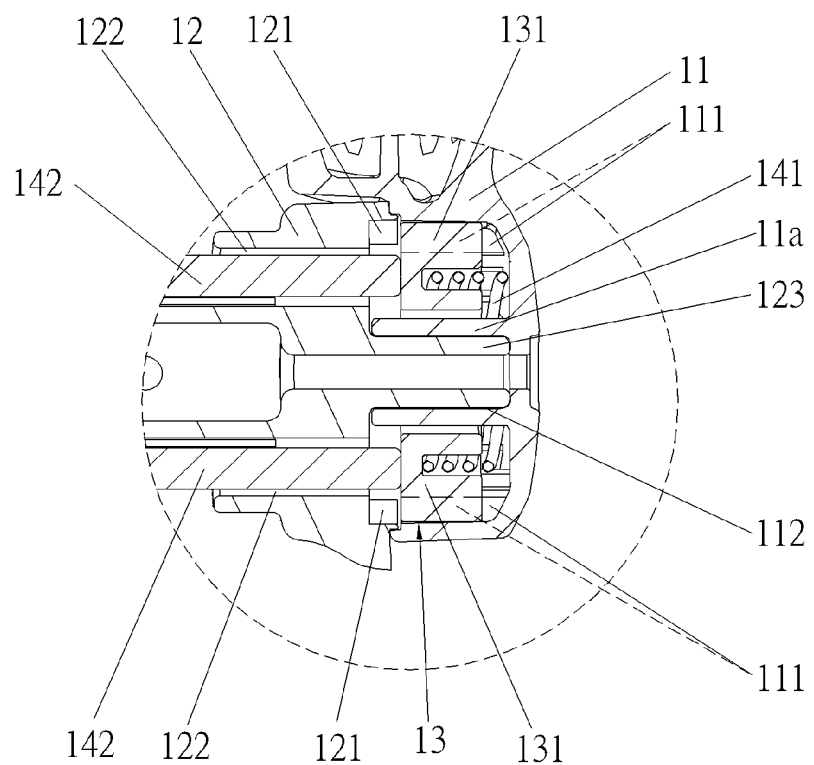
FIG. 9 is an enlarged view of the F portion in FIG. 8.

Accordingly, the second connection part 12 is disposed on the supporting leg 30; preferably, the second connection part 12 is disposed by a fixed insertion engagement with the supporting leg 30 for facilitating attachment and detachment of the second connection part 12 and the supporting leg 30. Certainly, in other embodiments, the second connection part 12 can be alternatively disposed on the stroller handle 20 by a practical requirement, which will not be described herein repeatedly. The second connection part 12 and the first connection part 11 are pivotally connected where a pivotal connection point P2 is formed. When the stroller 100 is unfolded completely, the pivotal connection point P2 is located between the pivotal connection point P1 and the pivotal connection point P3 in both the height direction and a front and rear direction. The first latch 13 can be selectively moved to a first locking position (as shown by FIG. 7) of locking the first connection part 11 and the second connection part 12 or a first unlocking position (as shown by FIG. 9) of unlocking the first connection part 11 with the second connection part 12. Preferably, the first latch 13 can be selectively moved to the first locking position of locking pivotal rotation of the first connection part 11 and the second connection part 12 or the first unlocking position of unlocking the first connection part 11 and the second connection part 12.

In practice, the first latch 13 is disposed in an accommodating space 18 formed by the first connection part 11 and the second connection part 12, for facilitating the configuration and installation of the first latch 13 and the engagement of the first latch 13 with the first connection part 11 and the second connection part 12. In more detail, each of the first connection part 11 and the second connection part 12 includes a first convex tooth 111 or 121. The first latch 13 includes a second convex tooth 131 corresponding to the first convex tooth 111 or 121, for enhancing the movable engagement of the first latch 13 with the first connection part 11 and the second connection part 12. Preferably, the first convex teeth 111 and 121 are internal gear structures. The second convex tooth 131 is a external gear structure inside the internal gear structure, so that the locking and unlocking by the first latch 13 to the pivotal rotation of the first connection part 11 and the second connection part 12 is more reliable. The actuating mechanism 14 is disposed adjacent to where the first connection part 11 and the second connection part 12 are pivotally connected. The actuating mechanism 14 is connected to the first latch 13 to be operable to selectively move the first latch 13 to the first locking position as shown by FIG. 7 or the unlocking position as shown by FIG. 9.

In practice, as shown in FIG. 7, when the first latch 13 is located at the first locking position, the first latch 13 is engaged to the first connection part 11 and the second connection part 12; as shown in FIG. 9, when the first latch 13 is located at the first unlocking position, the first latch 13 is disengaged from the second connection part 12. Certainly, in other embodiments, the first latch 13 can be alternatively disengaged from the first connection part 11 or both from the first connection part 11 and the second connection part 12 by a practical requirement. The locking and unlocking mechanism will be described in detail in the following.

In the embodiment, a first pivotal plane is formed between the first connection part 11 and the second connection part 12; that is, the first pivotal plane is the plane where the pivotal rotation of the first connection part 11 and the second connection part 12 occurs. A movement direction (i.e. the direction denoted by arrows D1 or D2) of the first latch 13 intersects the first pivotal plane, so that the first latch 13 can perform the locking and unlocking to the pivotal rotation of the first connection part 11 and the second connection part 12 in the intersection direction. Furthermore, a first pivotal axis is formed between the first connection part 11 and the second connection part 12; that is, the first pivotal axis is the rotation center line around which the first connection part 11 and the second connection part 12 pivot relative to each other. The movement direction of the first latch 13 is parallel to the first pivotal axis. Preferably, the movement direction of the first latch 13 aligns with the first pivotal axis; that is, a center line of the first latch 13 in the movement direction and the first pivotal axis are located at the same line, so as to simplify the configuration of the first latch 13 relative to the first connection part 11 and the second connection part 12.

Furthermore, the first connection part 11 has a pivot hole 112; preferably, the pivot hole 112 is disposed on a matching shaft 11a of the first connection part 11. The matching shaft 11a is formed by extending a portion of the first connection part 11 toward the second connection part 12. Accordingly, the second connection part 12 includes a pivot shaft 123 matching with the pivot hole 112. The pivot shaft 123 is inserted in coordination into the pivot hole 112 for achieving the pivotal rotation of the first connection part 11 and the second connection part 12, so that the pivotal connection of the first connection part 11 and the second connection part 12 is more simple and reliable. Certainly, in other embodiments, the matching shaft 11a and the pivot hole 112 can be alternatively disposed on the second connection part 12 by a practical requirement while the pivot shaft 123 is disposed on the first connection part 11. Such configuration also can perform the pivotal connection of the first connection part 11 and the second connection part 12 and will not be described herein in addition. Preferably, the first latch 13 is sleeved on the pivot shaft 123 and/or the matching shaft 11a so as to facilitate the configuration, installation and positioning of the first latch 13.

Figure 3:
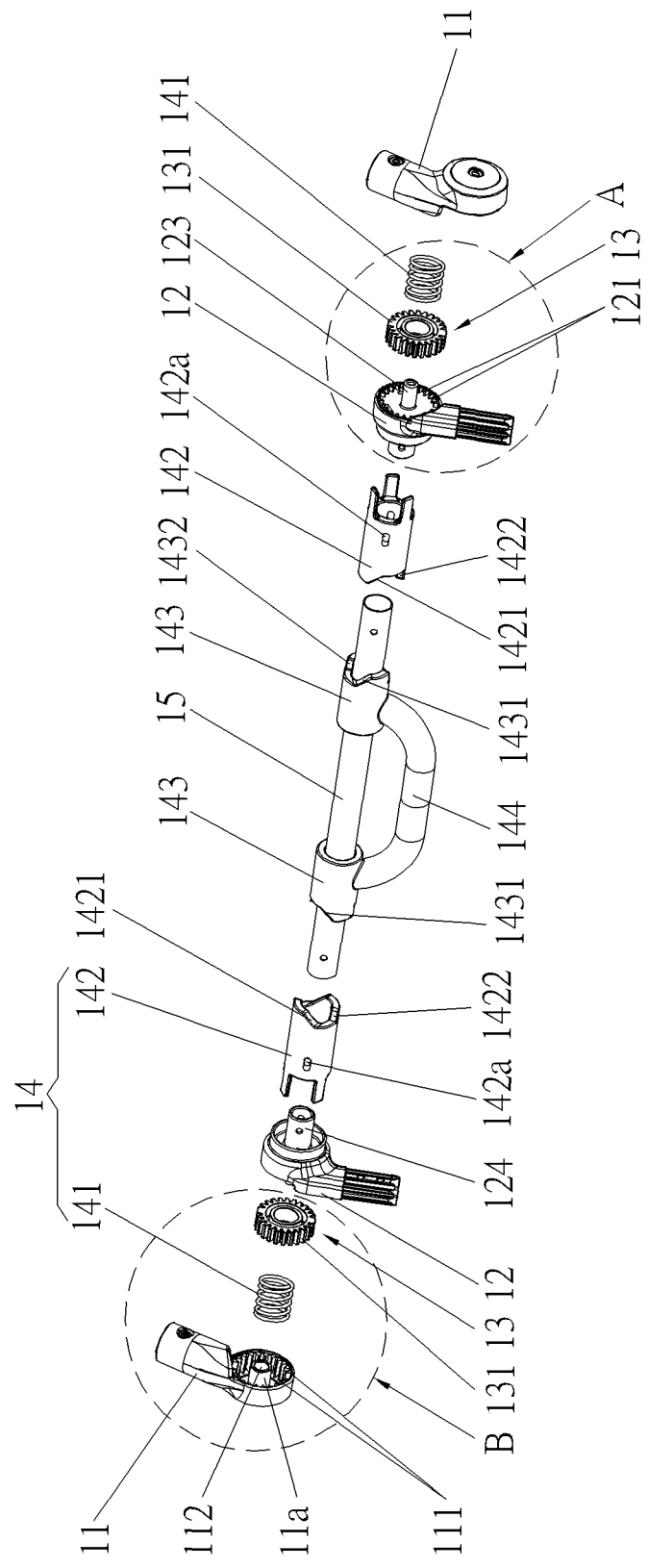
FIG. 3 is an exploded view of the joint device of the first embodiment according to the invention.
Figure 4:
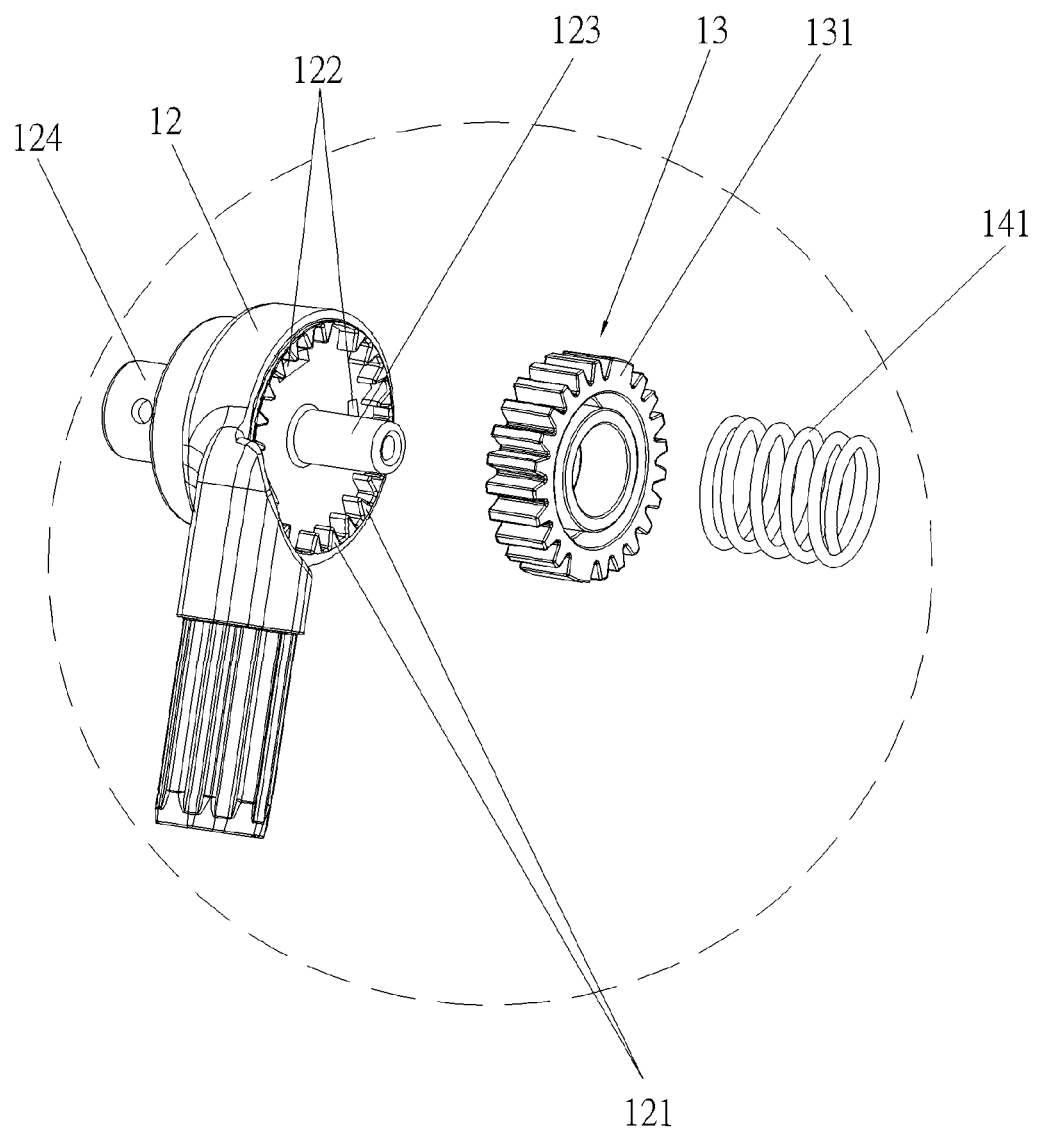
FIG. 4 is an enlarged view of the A portion in FIG. 3.
Figure 5:
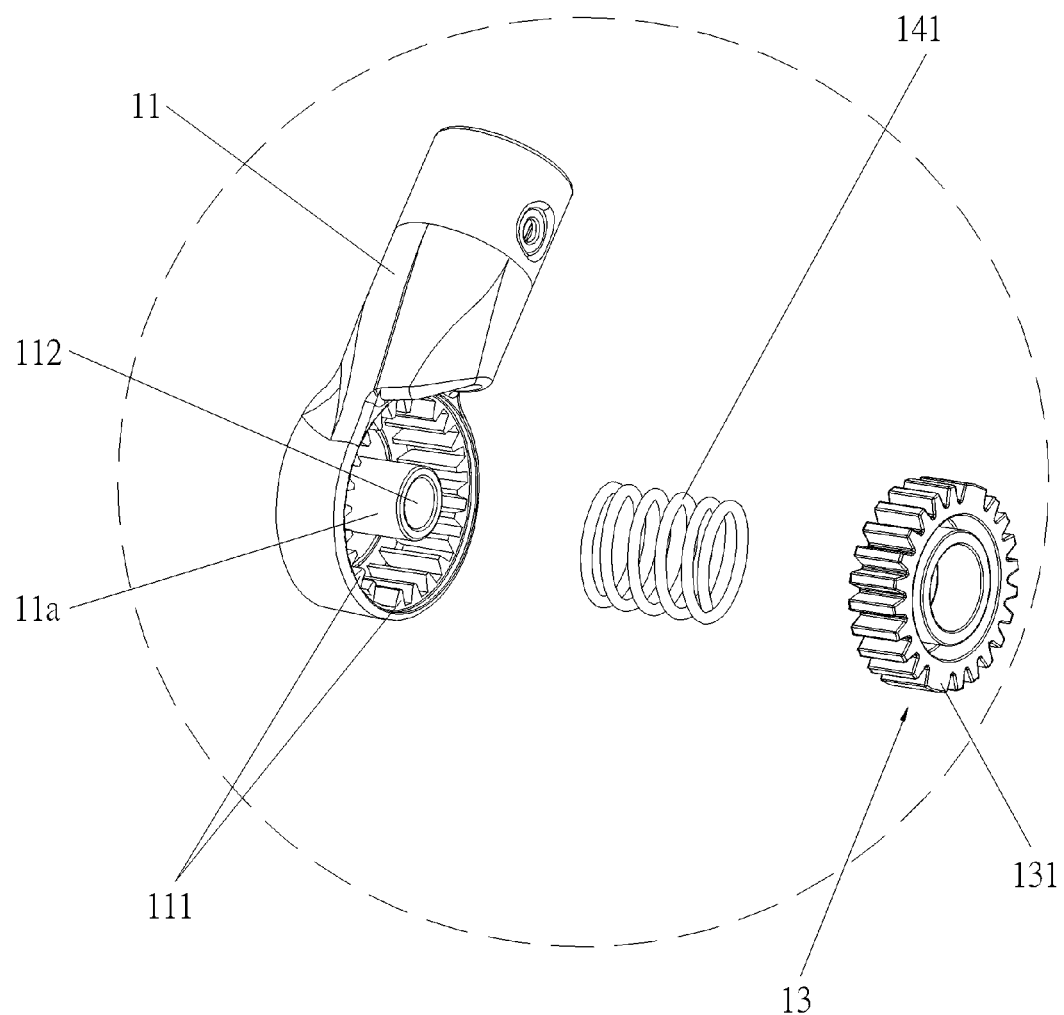
FIG. 5 is an enlarged view of the B portion in FIG. 3.
Figure 6:
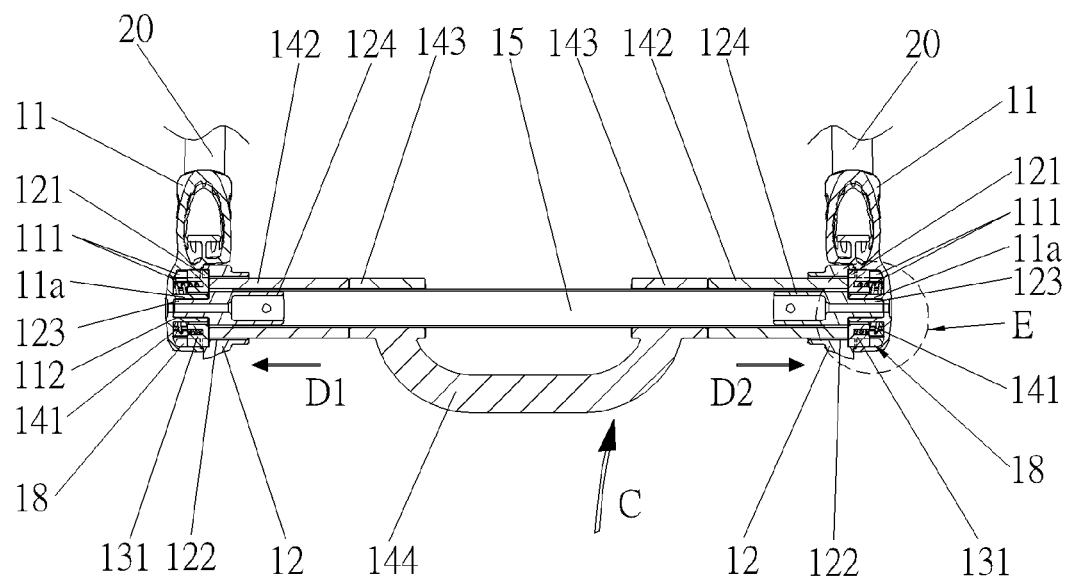
FIG. 6 is a sectional view of the joint device at the locking status of the first embodiment according to the invention.

Please continue referring to FIGS. 1 through 9. The actuating mechanism 14 includes a first resilient part 141 urging against the first latch 13 and a first pushing part 142. The first resilient part 141 pushes the first latch 13 so that the first latch 13 always has a tendency to move to the first locking position as shown by FIG. 7. The first pushing part 142 is operable to push the first latch 13 so that the first latch 13 moves to the first unlocking position as shown by FIG. 9, so that the actuating mechanism 14 can drive the first latch 13 to lock or unlock the pivotal rotation of the first connection part 11 and the second connection part 12 more reliably. In practice, as shown by FIGS. 3 through 5, in the embodiment, the first resilient part 141 is resiliently compressed to be disposed between the first connection part 11 and the first latch 13, for simplifying the structure of the actuating mechanism 14. Furthermore, the first pushing part 142 is connected to and passes through the second connection part 12 while the second connection part 12 has a through hole 122 for the first pushing part 142 to pass through, so that the first pushing part 142 located outside the second connection part 12 can extend into the accommodating space 18 to reliably urge the first latch 13 to move.

Furthermore, the joint device 10 of the embodiment further includes a supporting part 15 fixedly connected to the second connection part 12. Certainly, in other embodiments, the supporting part 15 can be alternatively fixedly connected to the first connection part 11; therefore, the invention is not limited thereto. The first pushing part 142 is slidably connected to the supporting part 15 for supporting the first pushing part 142. The movement direction (i.e. the direction of the arrow D1 or D2 in FIG. 6) of the first pushing part 142 is parallel to the movement direction of the first latch 13 for simplifying the mechanism of the first pushing part 142 pushing the first latch 13. In practice, a portion of the second connection part 12 extends toward the supporting part 15 to form a socket post 124 for being insertion-engaged with the supporting part 15. The supporting part 15 is fixedly connected to the second connection part 12 by insertion-engaging the socket post 124 with the supporting part 15. Therein, for providing guidance to sliding of the first pushing part 142, the first pushing part 142 has a guiding slot 142a, of which the extension direction is parallel to the movement direction of the first latch 13.

Accordingly, the supporting part 15 has a guiding post 151 slide-engaged with the guiding slot 142a. Certainly, in other embodiments, the guiding slot 142a can be alternatively disposed on the supporting part 15 by a practical requirement while the guiding post 151 is disposed on the first pushing part 142. In such configuration, the cooperation of the guiding post 151 with the guiding slot 142a can also provide guidance to the sliding of the first pushing part 142, which will not be described herein.

In addition, the actuating mechanism 14 further includes operation parts 143 pivotally connected to the supporting part 15. Preferably, the operation part 143 cooperates with the first pushing part 142. The operation part 143 includes an operation driving part 1431. An extension plane of the operation driving part 1431 intersects the movement direction of the first pushing part 142. The first pushing part 142 includes a pushing follower 1421 in coordination with the operation driving part 1431. When the operation part 143 is operated to pivot, the pushing follower 1421 is driven by rotating the operation driving part 1431 to move so that the first pushing part 142 slides to push the first latch 13. In practice, in the embodiment, the operation driving part 1431 is a driving surface. The pushing follower 1421 is a following surface. The driving surface and the following surface are designed to be slanted surfaces so as to simplifying manufacturing processes of the operation driving part 1431 and the pushing follower 1421. In practice, the operation part 143 further has a positioning surface 1432. The first pushing part 142 further has a stopping surface 1422 in coordination with the positioning surface 1432 for preventing the operation part 143 from being mis-operated. Therein, for convenient operation, the actuating mechanism 14 further includes a handle 144 connected to the operation parts 143. A user can use the handle 144 to rotate the operation parts 143 on the supporting part 15 for performing the operation part 143 driving the first pushing part 142 to move toward the first latch 13, so as to achieve the purpose of pushing the first latch 13.

On an association of FIGS. 1 through 15, the unfolding and folding of the stroller equipped with the joint device of the first embodiment according to the invention will be described in detail in the following. When the stroller 100 in FIG. 1, which is unfolded completely, is required to be folded to be the stroller 100 in FIG. 12, which is folded completely, the handle 144 is first to rotated on the supporting part 15 in the direction denoted by the arrow C in FIG. 6, 10, 11, 12 or 13. By the cooperation of the operation driving part 1431 of the operation part 143 with the pushing follower 1421 of the first pushing part 142, the rotating handle 144 pushes the first pushing part 142 to move on the supporting part 15 in a direction approaching the first latch 13. The guiding slot 142a of the first pushing part 142a and the guiding post 151 of the supporting part 1 provide orientation guidance to the movement of the first pushing part 142. The movement direction of the first pushing part 142 is denoted by the arrows D1 and D2 shown in FIG. 6. Therein, the moving first pushing part 142 urges the first latch 13 to overcome the resilient force by the first resilient part 141 and to move in the direction approaching the first connection part 11 until the first latch 13 is disengaged from the first convex tooth 121 of the second connection part 12. During the disengagement from the first convex tooth 121 of the second connection part 12, the first latch 13 is maintained to engage with the first convex tooth 111 of the first connection part 11, so that the first latch 13 releases the engagement of the stroller handle 20 with the supporting leg 30. Alternatively, disengaging the first latch 13 from the convex tooth 111 of the first connection part 11 and the first convex tooth 121 of the second connection part 12 also can make the first latch 13 release the engagement of the stroller handle 20 with the supporting leg 30.

Figure 10:
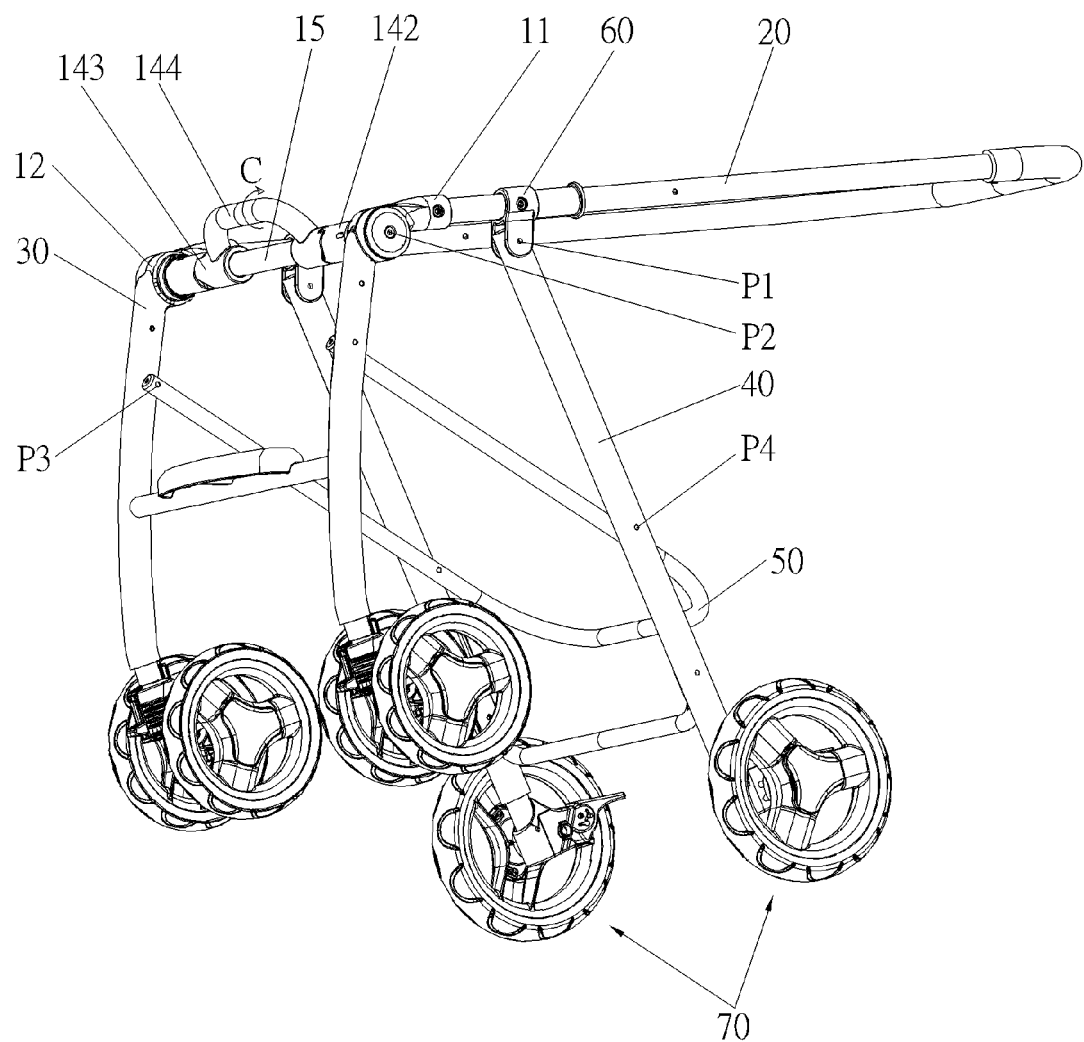
FIG. 10 is a perspective view of the stroller which is equipped with the joint devices of the first embodiment according to the invention and is being folded.
Figure 11:
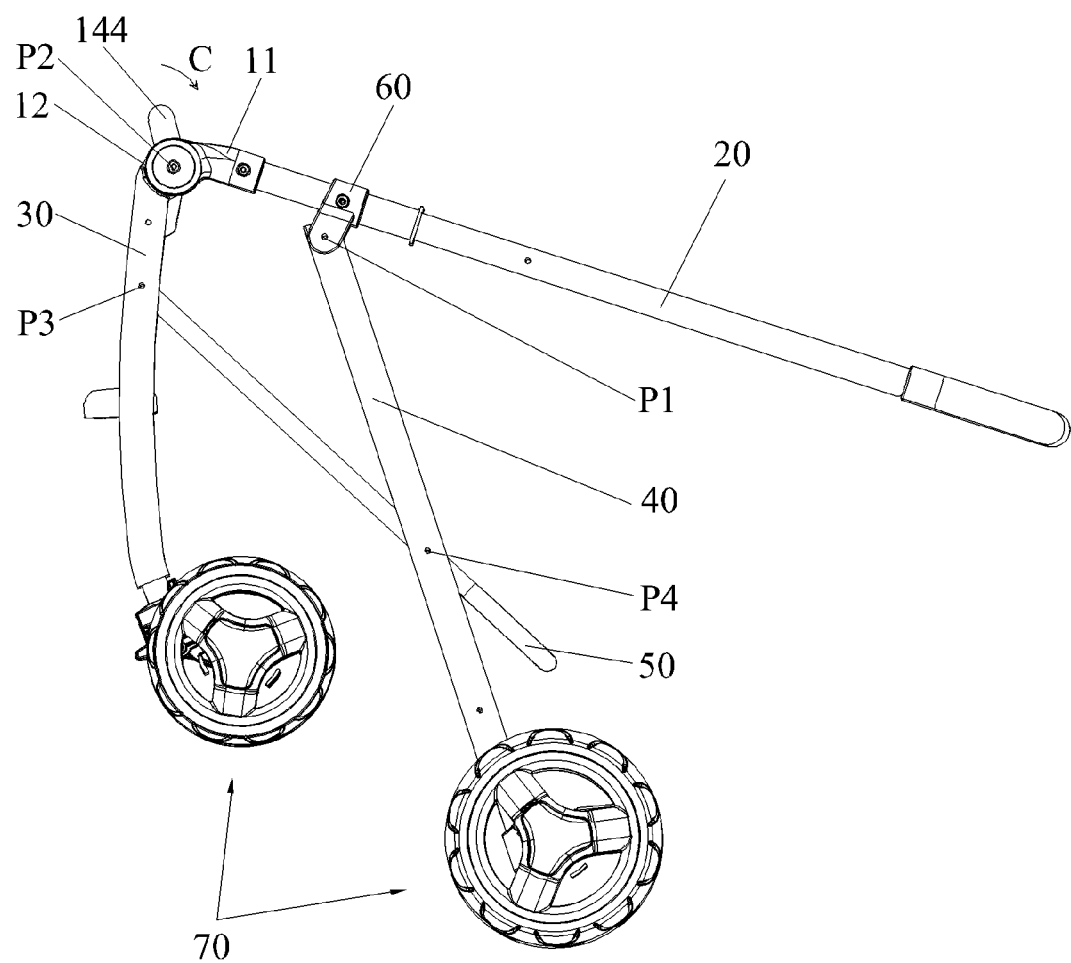
FIG. 11 is a side view of the stroller which is equipped with the joint devices of the first embodiment according to the invention and is being folded.
Figure 12:
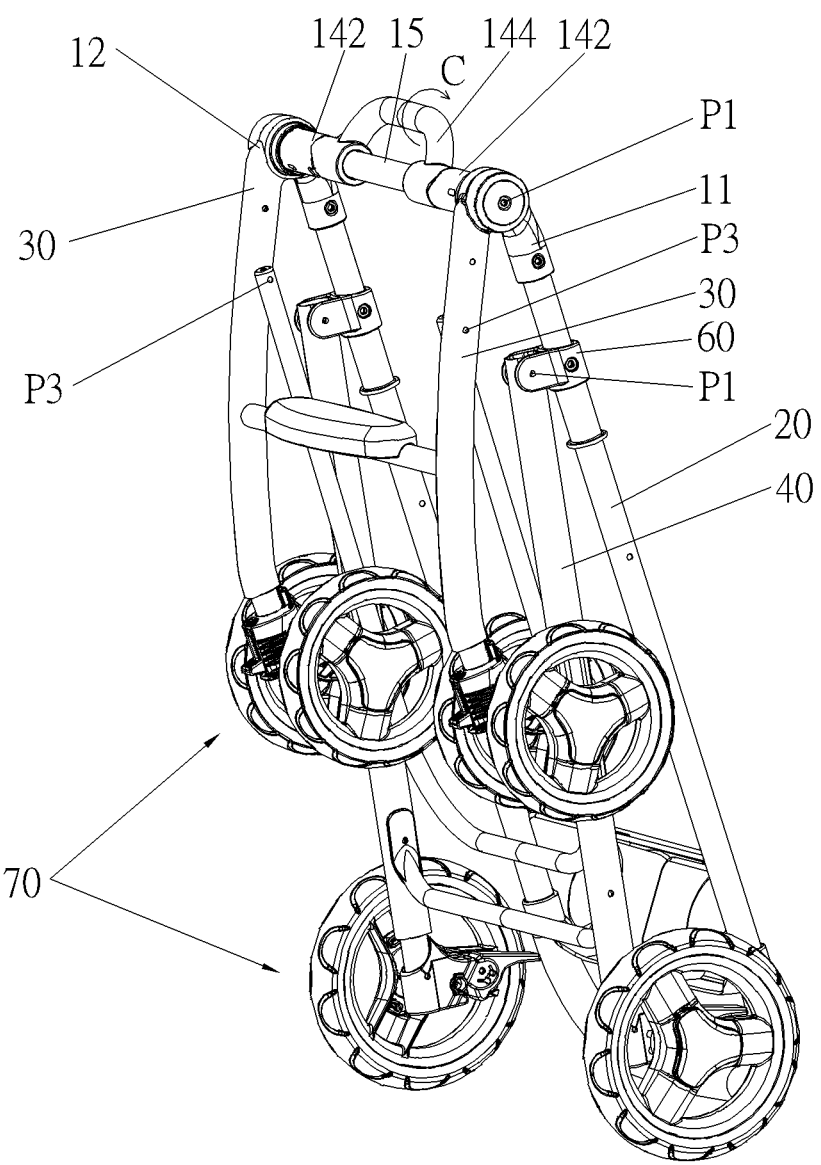
FIG. 12 is a perspective view of the stroller which is equipped with the joint devices of the first embodiment according to the invention and is folded completely with the joint devices being at the unlocking status.
Figure 13:
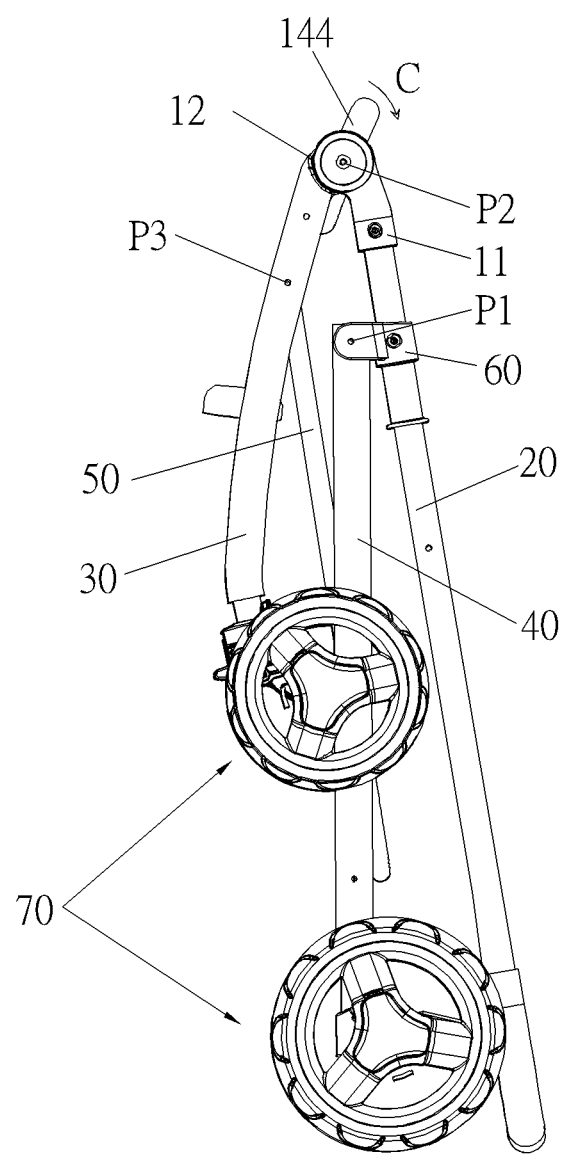
FIG. 13 is a side view of the stroller which is equipped with the joint devices of the first embodiment according to the invention and is folded completely with the joint devices being at the unlocking status.
Figure 14:
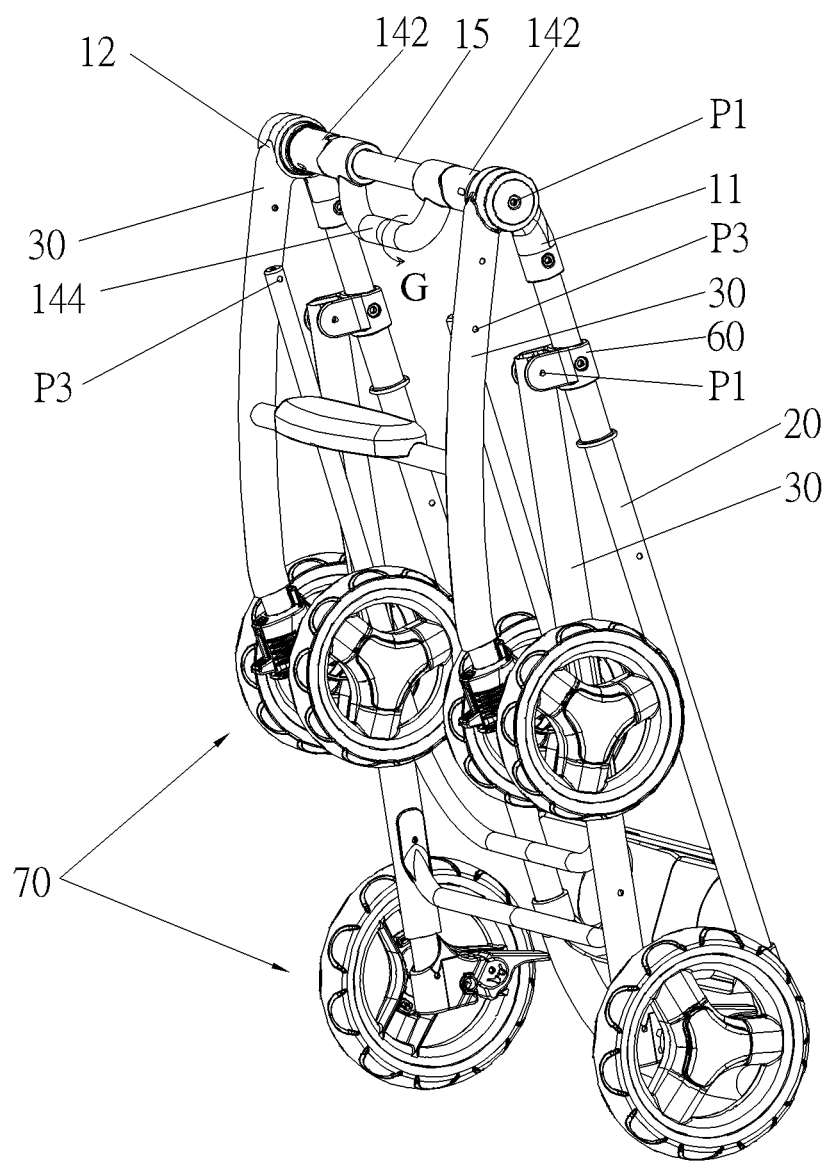
FIG. 14 is a perspective view of the stroller which is equipped with the joint devices of the first embodiment according to the invention and is folded completely with the joint devices being at the locking status.
Figure 15:
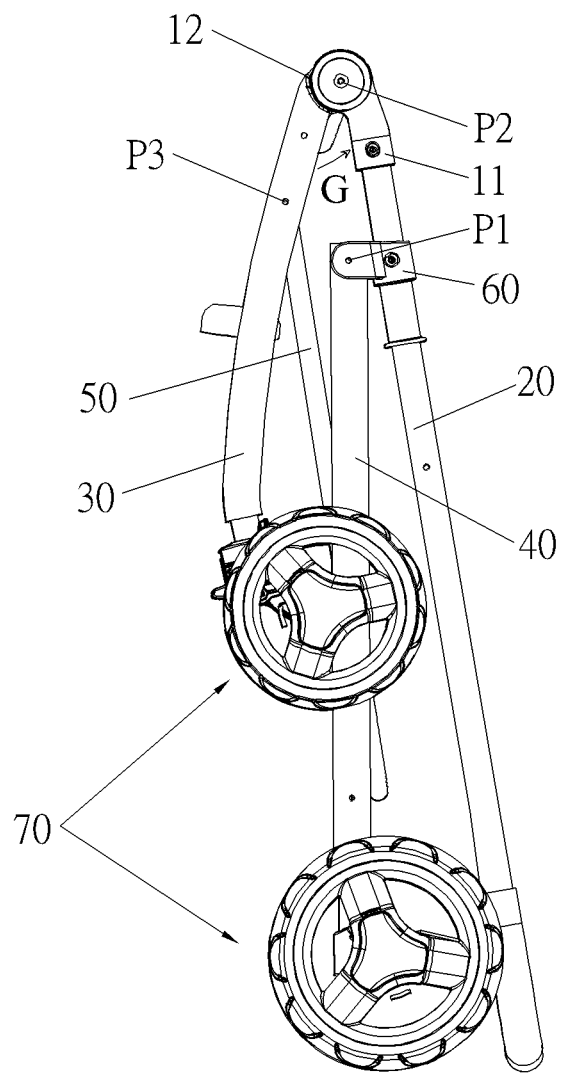
FIG. 15 is a side view of the stroller which is equipped with the joint devices of the first embodiment according to the invention and is folded completely with the joint devices being at the locking status.

By the above operation steps, the joint device 10 is transferred from the locking status to the unlocking status. Afterward, the stroller handle 20 can be rotated in the clockwise direction shown in FIG. 11 such that the stroller handle 20 rotates about the pivotal connection point P2. The rotating stroller handle 20 drives the supporting leg 40 to rotate about the pivotal connection point P1 to further drive the lower end portion of the bottom frame 50 to rotate about the pivotal connection point P4, so that the stroller 100 is gradually transferred from the unfolded status as shown by FIG. 10 or FIG. 11 to the folded status as shown by FIG. 12 or FIG. 13. When the stroller handle 20, the supporting legs 30, the supporting legs 40, and the bottom frame 50 are at the folded status as shown by FIG. 12 or FIG. 13, the handle 144 moves back to the original position in the direction denoted by the arrow G shown in FIG. 14 or FIG. 15 by the first resilient part 141 and also drives the operation parts 143, the first pushing parts 142, and the first latches 13 to move back to the original position in synchronous coordination, so as to achieve the purpose that the first latch 13 locks the first connection part 11 and the second connection part 12 again, which makes the joint device 10 of the embodiment at the unlocking status be transferred to be at the locking status as shown by FIG. 14 or FIG. 15. The folding operation on the stroller 100 is therefore completed.

Figure 16:
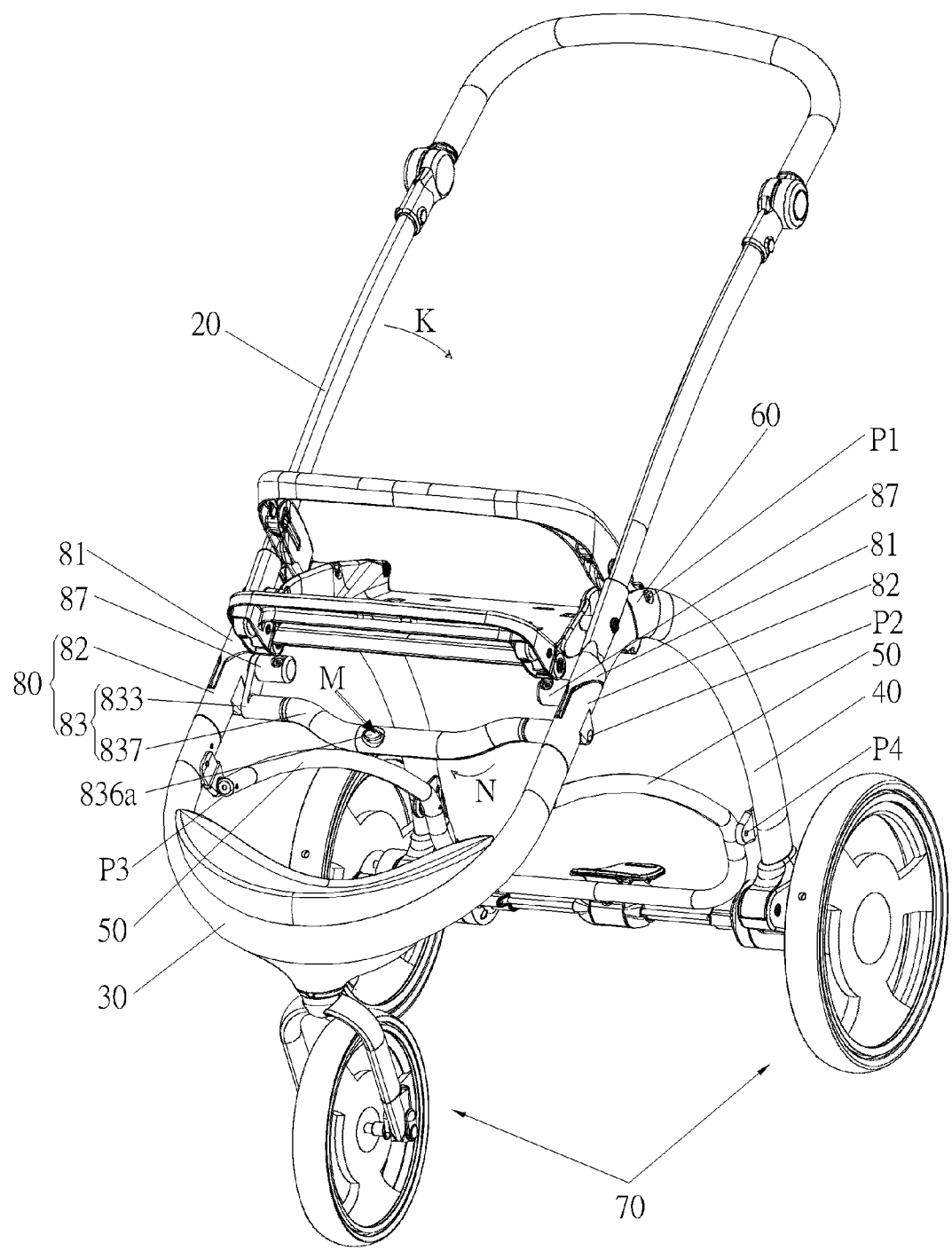
FIG. 16 is a perspective view of a stroller which is equipped with two joint devices of a second embodiment according to the invention and is unfolded completely with the joint devices being at a locking status.

Please refer FIG. 16, which illustrates a stroller 100' equipped with two joint devices 80 of a second embodiment according to the invention. The stroller 100' of the second embodiment and the stroller 100 of the first embodiment are similar in primary structure. The difference between them is that the joint device 80 of the second embodiment is structurally different to the joint device 10 of the first embodiment. The joint device 80 of the second embodiment will be described in detail in the following.

Please refer to FIGS. 17 through 23. The joint device 80 of the embodiment includes a first latch 84, an actuating mechanism 83, and two connection parts 81 and 82 pivotally connected to each other. For convenience in description, the two connection parts 81 and 82 are assigned to be a first connection part 81 and a second connection part 82 respectively. In practice, in the embodiment, the first connection part 81 is disposed on the stroller handle 20; preferably, the first connection part 81 is disposed by a fixed insertion engagement with the stroller handle 20 for facilitating attachment and detachment of the first connection part 81 and the stroller handle 20. Certainly, in other embodiments, the first connection part 81 can be alternatively disposed on the supporting leg 30 by a practical requirement, which will not be described herein repeatedly. Accordingly, the second connection part 82 is disposed on the supporting leg 30; preferably, the second connection part 82 is disposed by a fixed insertion engagement with the supporting leg 30 for facilitating attachment and detachment of the second connection part 82 and the supporting leg 30. Certainly, in other embodiments, the second connection part 82 can be alternatively disposed on the stroller handle 20 by a practical requirement, which will not be described herein repeatedly.

Figure 17:
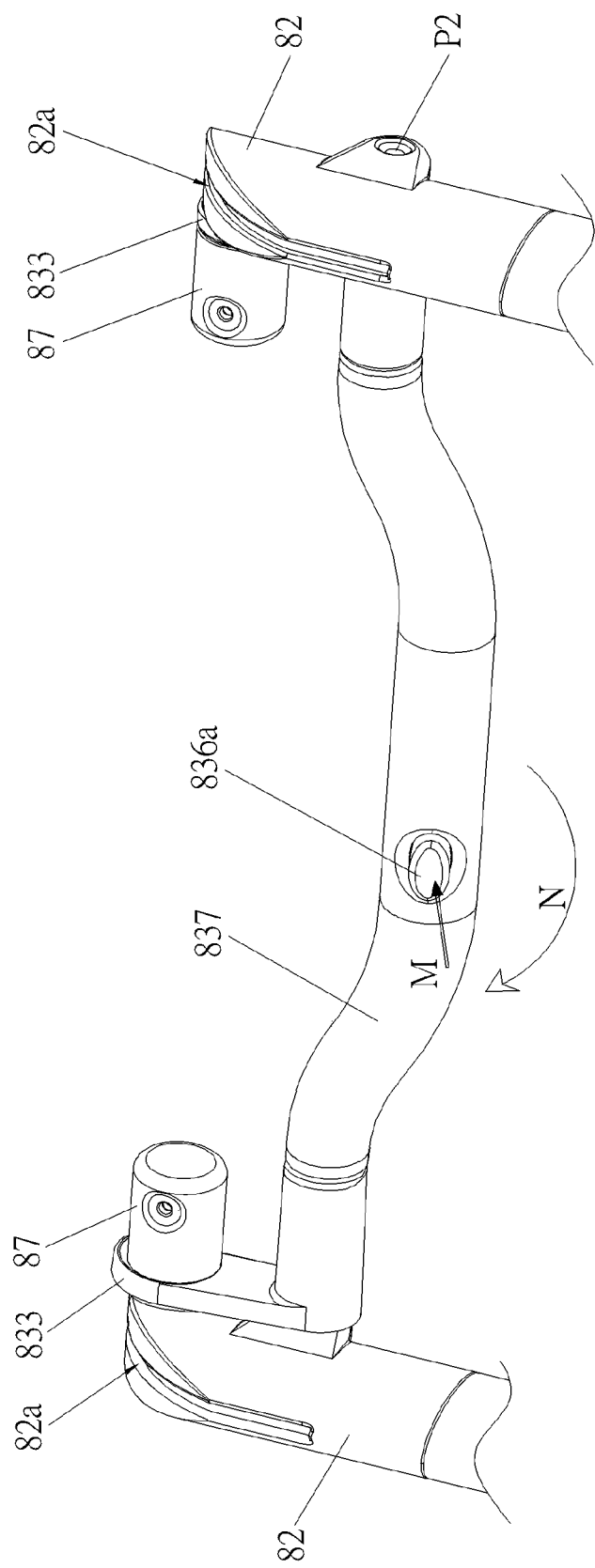
FIG. 17 is a perspective view of the joint device of the second embodiment according to the invention with removing a first connection part.
Figure 18:
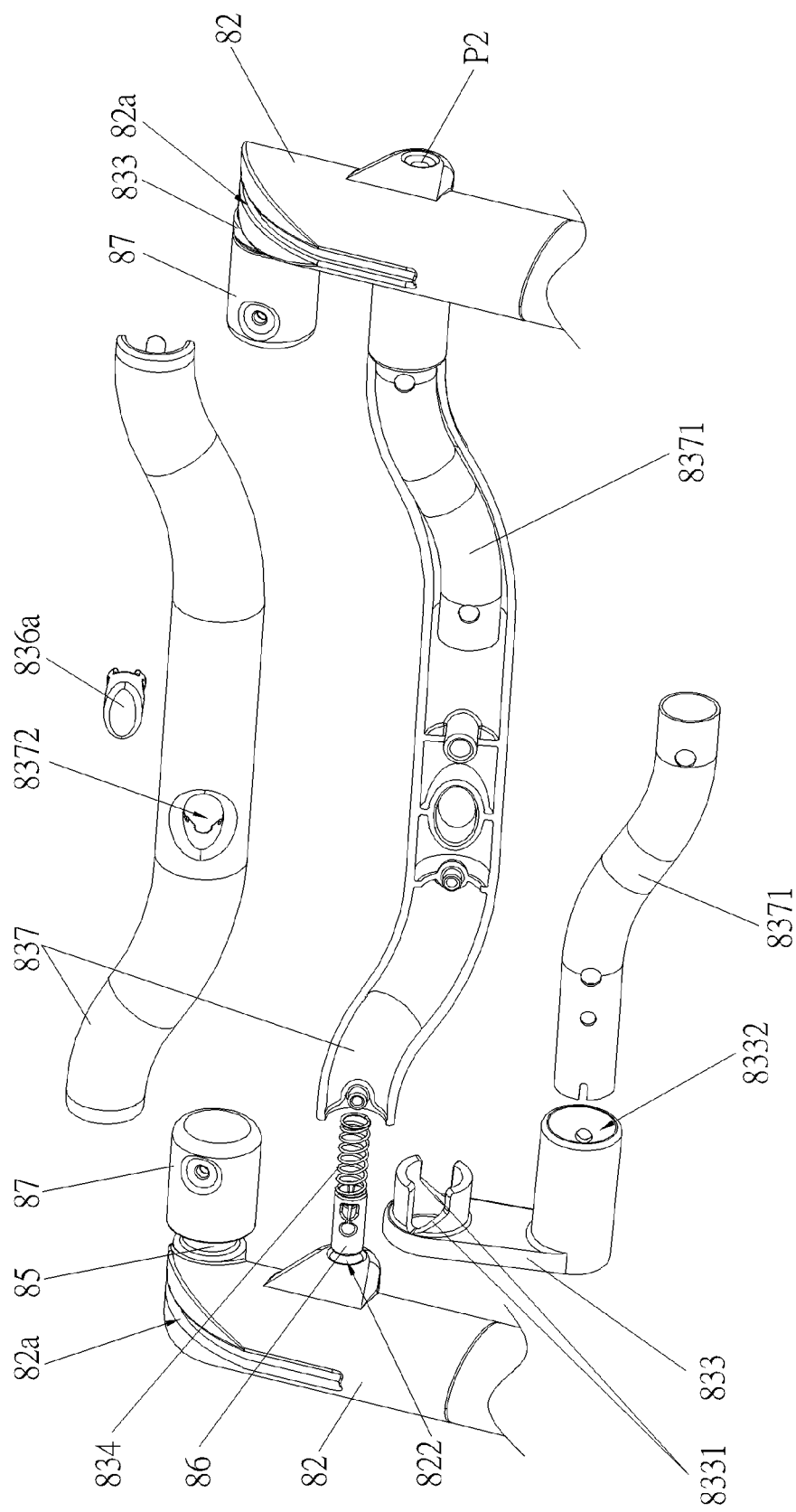
FIG. 18 is an exploded view of FIG. 17.
Figure 21:
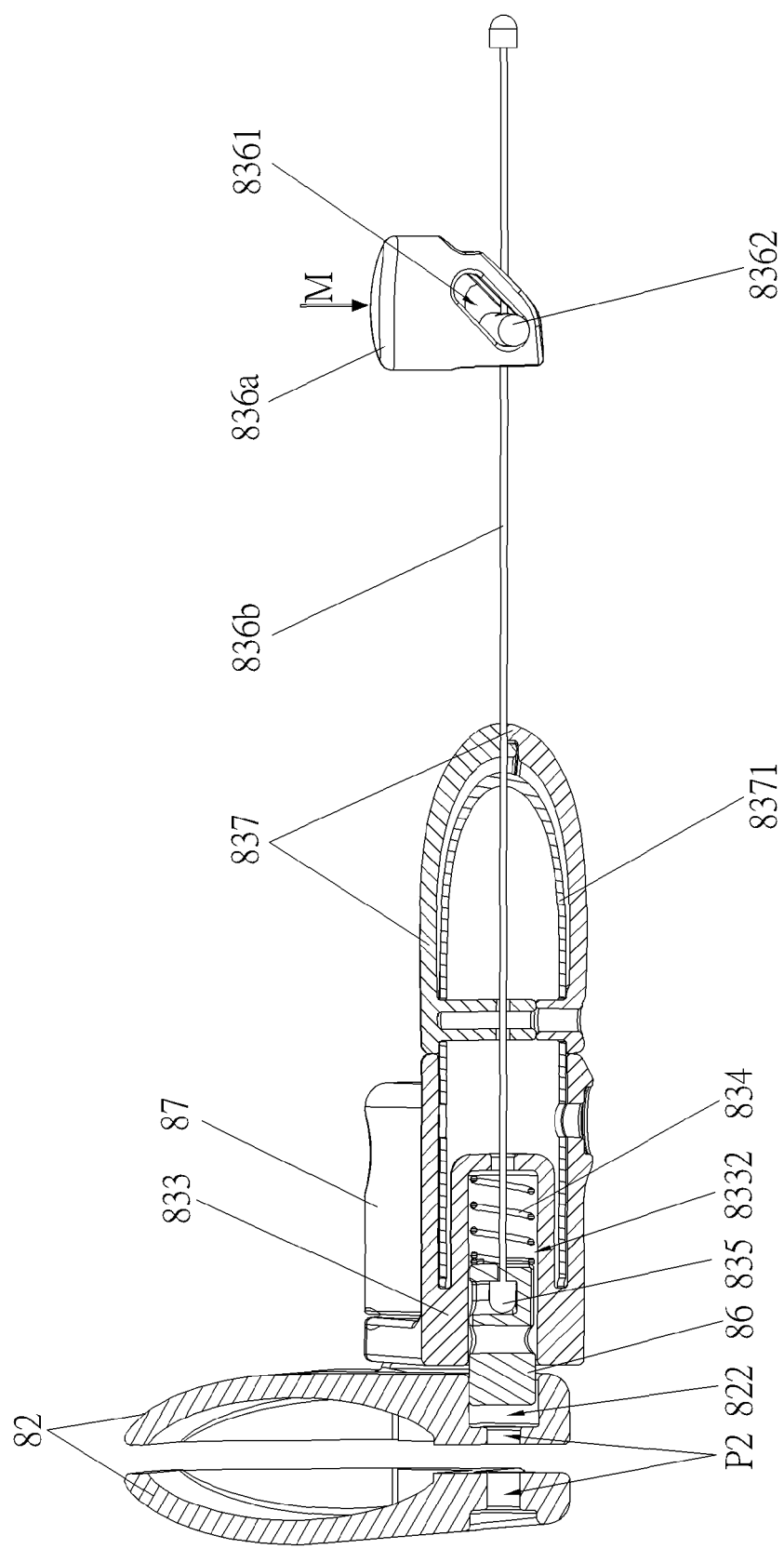
FIG. 21 is another sectional view of the joint device at the locking status of the second embodiment according to the invention.
Figure 23:
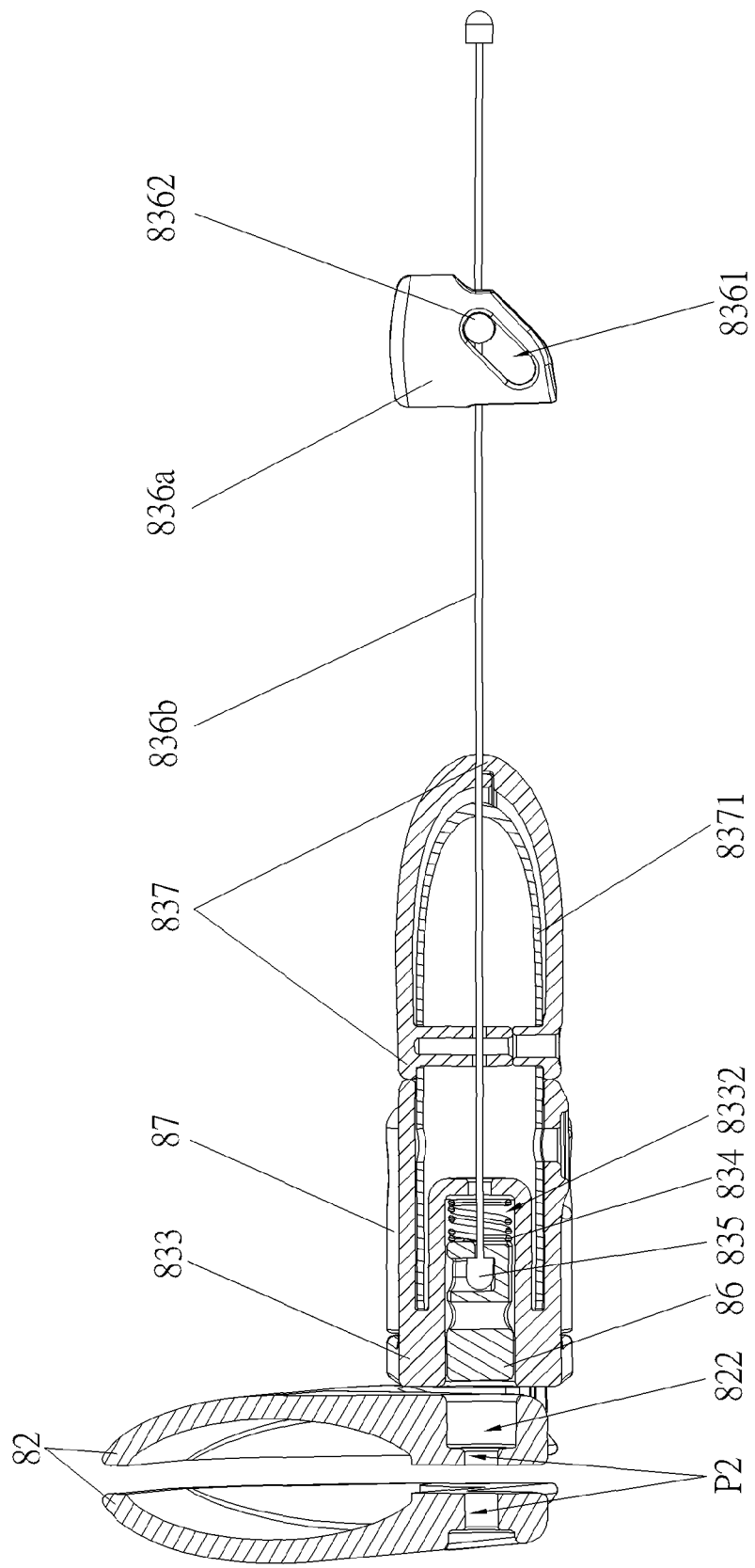
FIG. 23 is another sectional view of the joint device at the unlocking status of the second embodiment according to the invention.

The second connection part 82 and the first connection part 81 are pivotally connected where the pivotal connection point P2 is formed. When the stroller 100' is unfolded completely, the pivotal connection point P2 is located between the pivotal connection point P1 and the pivotal connection point P3 in both the height direction and a front and rear direction. The first latch 84 can be selectively moved to a first locking position (as shown by FIG. 17 or FIG. 21) of locking the first connection part 81 and the second connection part 82 or a first unlocking position (as shown by FIG. 23) of unlocking the first connection part 81 with the second connection part 82. Preferably, the first latch 84 can be selectively moved to the first locking position (as shown by FIG. 17 or FIG. 21) of locking pivotal rotation of the first connection part 81 and the second connection part 82 or the first unlocking position (as shown by FIG. 23) of unlocking the first connection part 81 and the second connection part 82.

In practice, each of the first connection part 81 and the second connection part 82 has an engaging slot 811 or 821 for inserting the first latch 84, so that when the first latch 84 moves to insertion engage with the first engaging slot 811 of the first connection part 81 and the first engaging slot 821 of the second connection part 82, the pivotal rotation of the first connection part 81 and the second connection part 82 is therefore locked. Certainly, in other embodiments, it is practicable that only the first connection part 81 has the first engaging slot 811 for inserting the first latch 84, which also can perform locking and unlocking by the first latch 84 to the pivotal rotation of the first connection part 81 and the second connection part 82; therefore, the invention is not limited thereto. When the first latch 84 moves to disengage from the first engaging slot 811 of the first connection part 81, the locking to the pivotal rotation of the first connection part 81 and the second connection part 82 is released. Such configuration simplifies the mechanism of the locking and unlocking by the first latch 84 to the pivotal rotation of the first connection part 81 and the second connection part 82. The second embodiment is based on disengaging the first latch 84 from the first engaging slot 811; preferably, the first engaging slot 811 of the first connection part 81 passes through a side of the first connection part 81 near the second connection part 82, for facilitating the engagement of the first latch 84 with the first connection part 81. Optionally, an end portion of the first connection part 81 has an insertion part 81a. The second connection part 82 has an insertion slot 82a correspondingly. The insertion part 81a of the first connection part 81 is inserted into the insertion slot 82a of the second connection part 82. The insertion part 81a and the insertion slot 82a are located where the first connection part 81 and the second connection part 82 are pivotally connected, so that the configuration of the pivotal connection of the first connection part 81 and the second connection part 82 is much simpler and aesthetic.

Figure 19:
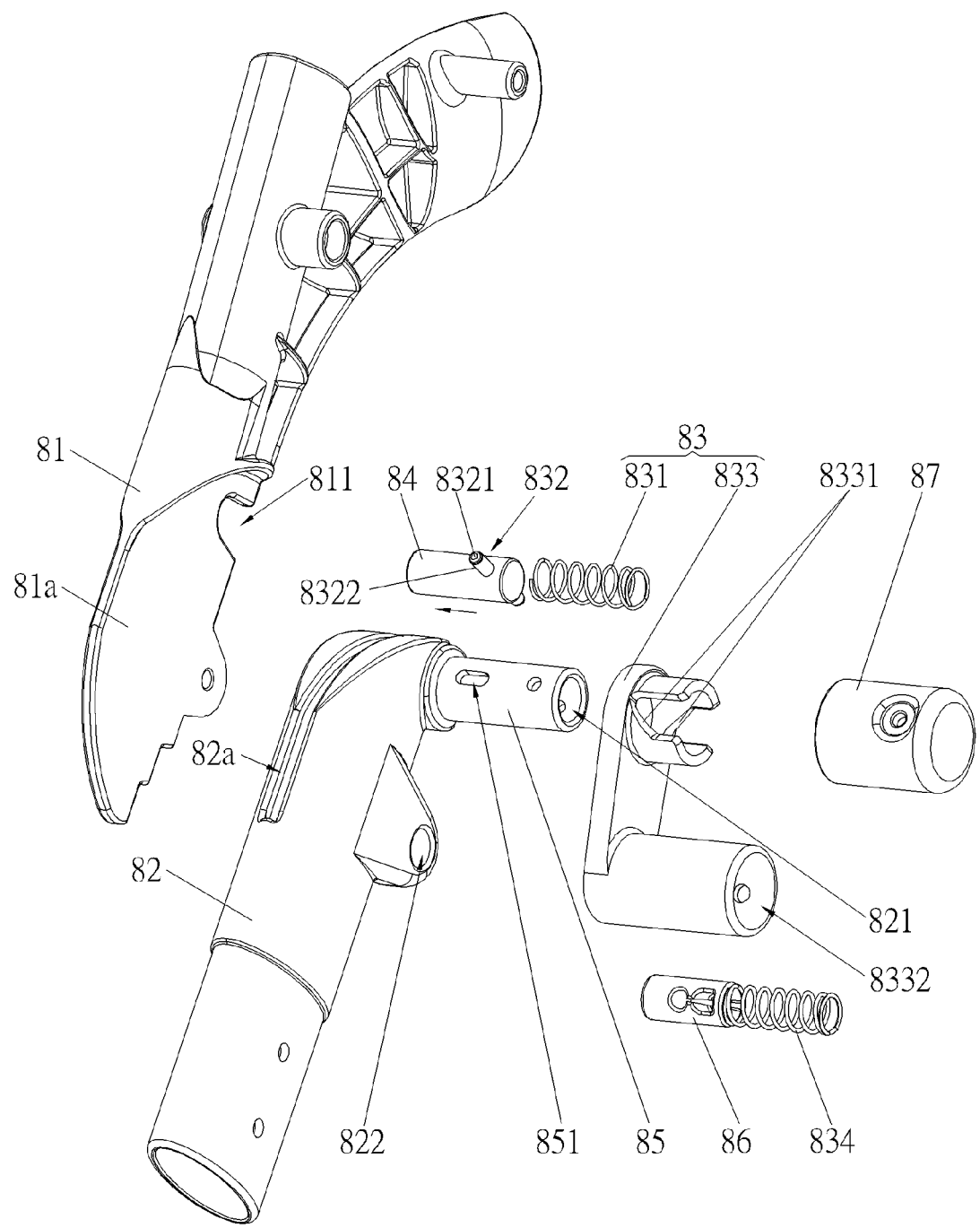
FIG. 19 is an exploded view of the joint device of the second embodiment according to the invention.

The actuating mechanism 83 is disposed adjacent to where the first connection part 81 and the second connection part 82 are pivotally connected. The actuating mechanism 83 is connected to the first latch 84 to be operable to selectively move the first latch 84 to a first locking position shown in FIG. 21 or a first unlocking position shown in FIG. 23. In practice, as shown by FIG. 19 and FIG. 21, when the first latch 84 is located at the first locking position, the first latch 84 is engaged to the first connection part 81 and the second connection part 82. Optionally, by an actual requirement, when the first latch 84 is located at the first locking position, the first connection part 81 can be held between the first latch 84 and the second connection part 82, or the second connection part 82 can be held between the first latch 84 and the first connection part 81. Both configurations can perform locking the pivotal rotation of the first connection part 81 and the second connection part 82. As shown by FIG. 23, when the first latch 84 is located at the first unlocking position, the first latch 84 is disengaged from the first connection part 81. Certainly, in other embodiments, the first latch 84 can be alternatively disengaged from the first connection part 81 or both from the first connection part 81 and the second connection part 82 by a practical requirement. The more details will be described in the following.

In the embodiment, a first pivotal plane is formed between the first connection part 81 and the second connection part 82; that is, the first pivotal plane is the plane where the pivotal rotation of the first connection part 81 and the second connection part 82 occurs. A movement direction (i.e. the direction denoted by an arrow near the first latch 84 or the reverse direction thereof in FIG. 19) of the first latch 84 intersects the first pivotal plane, so that the first latch 84 can perform the locking and unlocking to the pivotal rotation of the first connection part 81 and the second connection part 82 in the intersection direction. Furthermore, a first pivotal axis is formed between the first connection part 81 and the second connection part 82; that is, the first pivotal axis is the rotation center line around which the first connection part 81 and the second connection part 82 pivot relative to each other. The movement direction of the first latch 84 is parallel to the first pivotal axis. Preferably, the movement direction of the first latch 84 is shifted relative to the first pivotal axis; that is, a center line of the first latch 84 in the movement direction and the first pivotal axis are not located at the same line, so that the pivotal connection portion and the engagement portion of the first connection part 81 and the second connection part 82 are shifted relative to each other, so as to simplify the configuration of the first latch 84 relative to the first connection part 81 and the second connection part 82.

As shown by FIG. 19, the actuating mechanism 83 includes a first resilient part 831 urging against the first latch 84 and a first pushing part 832. The first resilient part 831 pushes the first latch 84 so that the first latch 84 has a tendency to move to the first locking position as shown in FIG. 21. The first pushing part 832 is operable to push the first latch 84 so that the first latch 84 moves to the first unlocking position as shown in FIG. 23, so that the actuating mechanism 83 can drive the first latch 84 to lock and unlock the pivotal rotation of the first connection part 81 and the second connection part 82 more reliably. In practice, in the embodiment, the first resilient part 831 is resiliently compressed to be disposed between the first latch 84 and an operation part 833 which will be described in the following, for simplifying the structure of the actuating mechanism 83.

Furthermore, the joint device 80 of the embodiment further includes a supporting part 85 fixedly connected to the second connection part 82. Certainly, in other embodiments, the supporting part 85 can be alternatively fixedly connected to the first connection part 81; therefore, the invention is not limited thereto. The first pushing part 832 is slidably connected to the supporting part 85 for supporting the first pushing part 832. The movement direction (i.e. the direction denoted by an arrow near the first latch 84 or the reverse direction thereof in FIG. 19) of the first pushing part 832 is parallel to the movement direction of the first latch 84 for simplifying the mechanism of the first pushing part 832 pushing the first latch 84. In practice, an end portion of the first latch 84 passes through the supporting part 85. The first pushing part 832 passes through the supporting part 85 in a direction intersecting the movement direction of the first latch 84. An end portion of the first pushing part 832 extends out of the supporting part 85. Therein, for providing guidance to sliding of the first pushing part 832, the first pushing part 832 has a guiding post 8321 while the supporting part 85 has a guiding slot 851. The extension direction of the guiding slot 851 is parallel to the movement direction of the first latch 84. The guiding post 8321 and the guiding slot 851 are slidably engaged with each other. Certainly, in other embodiments, the guiding slot 851 can be alternatively disposed on the first pushing part 832 by a practical requirement while the guiding post 8321 is disposed on the supporting part 85. In such configuration, the cooperation of the guiding post 8321 with the guiding slot 851 can also provide guidance to the sliding of the first pushing part 832, which will not be described herein.

In addition, the actuating mechanism 83 further includes an operation part 833 pivotally connected to the supporting part 85. Preferably, the operation part 833 cooperates with the first pushing part 832. The operation part 833 includes an operation driving part 8331. An extension plane of the operation driving part 8331 intersects the movement direction of the first pushing part 832. The first pushing part 832 includes a pushing follower 8322 in coordination with the operation driving part 8331. When the operation part 833 is operated to pivot, the pushing follower 8322 is driven by rotating the operation driving part 8331 to move so that the first pushing part 832 slides to push the first latch 84. In practice, in the embodiment, the operation driving part 8331 is a driving slanted surface. The pushing follower 8322 is a following surface formed by a side surface of the guiding post 8321, so as to simplifying manufacturing processes of the operation driving part 8331 and the pushing follower 8322.

Therein, for convenient operation, the actuating mechanism 83 further includes a handle 837 connected to the operation parts 833. Preferably, the handle 837 is equipped with a connection tube 8371 disposed inside. The handle 837 is fixedly connected to the operation part 833 through the connection tube 8371, so that the handle 837 is fixedly connected to the operation part 833 more firmly; therefore, a user can use the handle 837 to rotate the operation parts 833 on the supporting part 85 for performing the operation part 833 driving the first pushing part 832 to push the first latch 84, so as to achieve the purpose of pushing the first latch 84. For coverage of the cooperation portion of the operation part 833 and the first pushing part 832 for an appearance simplification of the joint device 80 in the embodiment, a decoration cover 87 is sleeved on the operation part 833. The decoration cover 87 covers the cooperation portion of the operation part 833 and the first pushing part 832.

Please refer to FIGS. 18 through 23. The joint device 80 of the embodiment further includes a second latch 86. The second latch 86 can be selectively moved to a second locking position (as shown in FIG. 21) of locking the second connection part 82 and the operation part 833 or a second unlocking position (as shown in FIG. 23) of unlocking the second connection part 82 and the operation part 833, regarding as a second security lock for avoiding unexpectedly unlocking. Preferably, the second latch 86 can be selectively moved to the second locking position (as shown in FIG. 21) of locking the pivotal rotation of the second connection part 82 and the operation part 833 or the second unlocking position (as shown in FIG. 23) of unlocking the pivotal rotation of the second connection part 82 and the operation part 833.

Certainly, in other embodiments, the second latch can be selectively moved to the second locking position of locking the first connection part and the operation part or the second unlocking position of unlocking the first connection part and the operation part, for further enhancing the reliability of locking the pivotal rotation of the first connection part 81 and the second connection part 82 and for regarding as a second security lock for avoiding unexpectedly unlocking. In practice, in the embodiment, each of the second connection part 82 and the operation part 833 has a second engaging slot 822 or 8332 for inserting the second latch 86, so that the locking by the second latch 86 to the pivotal rotation of the second connection part 82 and the operation part 833 is more reliable. Certainly, in other embodiments, it is practicable that each of the first connection part 82 and the operation part has the second engaging slot for inserting the second latch 86, or only the first connection part or the second connection part has the second engaging slot; therefore, the invention is not limited thereto.

Furthermore, a second pivotal plane is formed between the supporting part 85 and the operation part 833. The movement direction of the second latch 86 intersects the second pivotal plane, for simplifying the mechanism of the second latch 86 locking the pivotal rotation of the second connection part 82 and the operation part 833. In practice, a second pivotal axis is formed between the supporting part 85 and the operation part 833, for further simplifying the structure of the second latch 86. When the second latch 86 is located at the second locking position shown in FIG. 21, the second latch 86 is engaged with the second connection part 82 and the operation part 833. When the second latch 86 is located at the second unlocking position shown in FIG. 23, the second latch 86 is disengaged from the second connection part 82.

Certainly, by an actual requirement, when the second latch 86 is located at the second locking position, the second latch 86 can be designed to be engaged with both the first connection part 81 and the operation part 833; when the second latch 86 is located at the second unlocking position, the second latch 86 can be designed to be disengaged from both the first connection part 81 and the operation part 833.

In addition, the actuating mechanism 83 further includes a second resilient part 834 urging against the second latch 86 and a second pushing part 835. The second resilient part 834 pushes the second latch 86 so that the second latch 86 has a tendency to move to the second locking position shown in FIG. 21. The second pushing part 835 is operable to push the second latch 86 to move to the second unlocking position shown in FIG. 23.

In practice, the second resilient part 834 is resiliently compressed to be disposed between the operation part 833 and the second latch 86, so that the configuration of the second latch 86 and the second resilient part 834 on the operation part 833 can be more practicable. In the embodiment, the actuating mechanism 83 further includes a second button component 836 connected to the second pushing part 835. Preferably, the second button component 836 is connected to the second pushing part 835 in a far place. The second button component 836 includes a second button 836*a* and a second linking part 836*b* connecting the second button 836*a* and the second pushing part 835. The second button 836*a* can be pressed to drive the second linking part 836*b* to pull the second pushing part 835 so that the second pushing part 835 slides to push the second latch 86, for convenience of a user to operate in a remote way.

Certainly, in other embodiments, the second pushing part 835 can be eliminated with connecting the second linking part 836*b* directly to the second latch 86. The second button 836*a* is connected to the second linking part 836*b*, so that the second button 836*a* pulls the second latch 86 to move by the second linking part 836*b*, so as to disengage the second latch 86 from the second engaging slot 822 of the second connection part 82, for simplifying the structure of the actuating mechanism 83. Preferably, the second linking part 836*b* is a steel wire, for facilitating the pulling by the second linking part 836*b* to the second latch 86. The second button 836*a* is movably disposed on the operation part 833. In practice, the second button 836*a* is movably disposed on the handle 837, so that the second button 836*a* can move on the operation part 833 through the handle 837. The second button 836*a* includes a second button driving part 8361.

Preferably, the second button driving part 8361 is a slanted long slot. An extension plane of the second button driving part 8361 intersects the movement direction of the second pushing part 835. The second linking part 836*b* includes a second linking follower 8362 in coordination with the second button driving part 8361. Preferably, the second linking follower 8362 is a post structure which is disposed to pass through the slanted long slot with a gap therebetween. The purpose of such configuration is that the second button driving part 8361 can be pressed to drive the second linking follower 8362 so that the second linking part 836*b* drives the second latch 86 to move, which simplifies the mechanism of the second button 836*a* driving the second linking part 836*b* to move. For example, the second linking part 836*b* is disposed inside the operation part 833 and the handle 837, so that the joint device 80 of the embodiment is presented in a simpler form.

Figure 22:
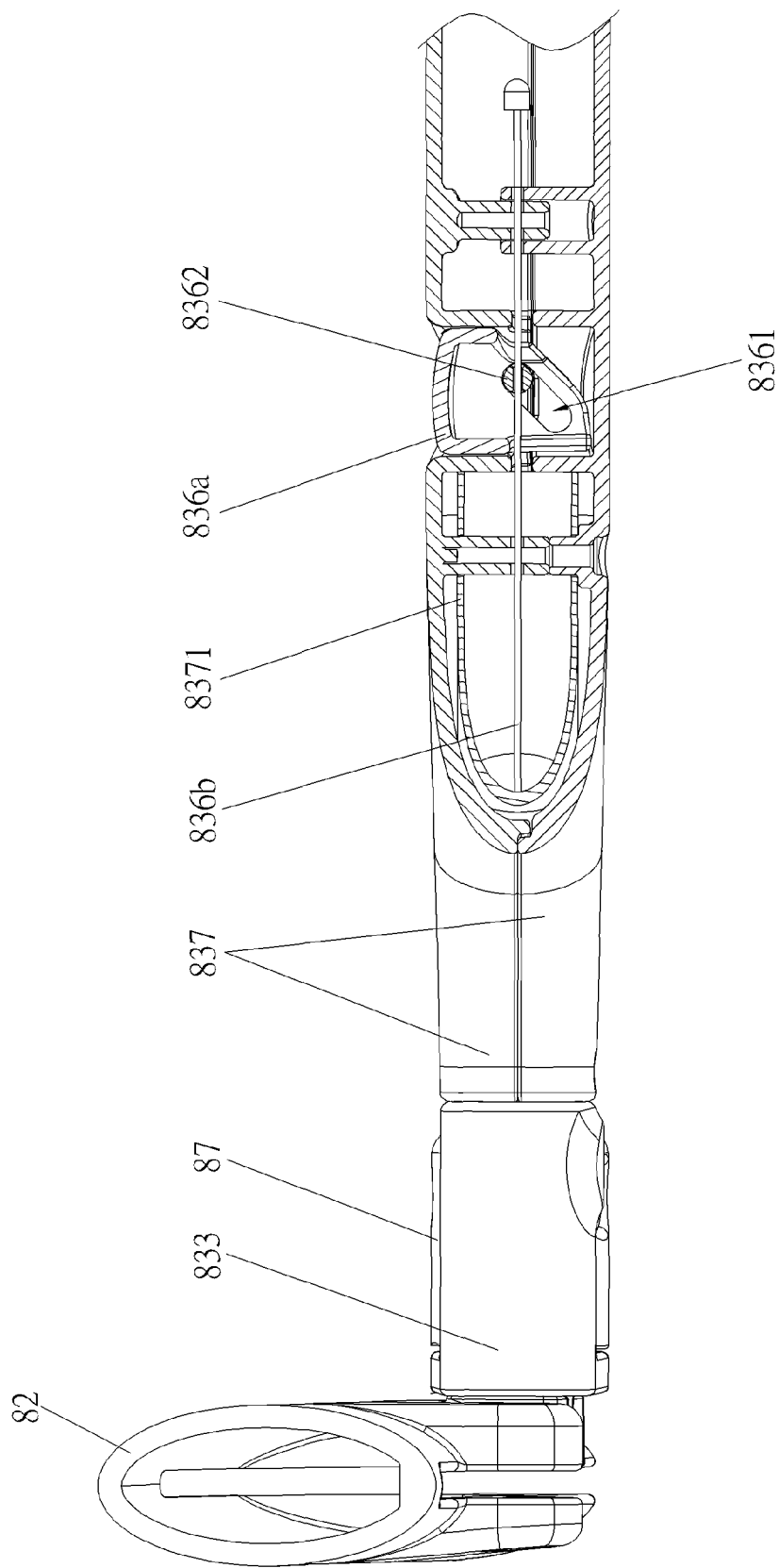
FIG. 22 is a sectional view of the joint device at an unlocking status of the second embodiment according to the invention.

On an association of FIGS. 16 through 24, the unfolding and folding of the stroller 100' equipped with the joint device 80 of the embodiment will be described in detail in the following. When the stroller 100' in FIG. 16, which is unfolded completely, is required to be folded to be the stroller 100' in FIG. 24, which is folded completely, the second button 836*a* is first to be pressed in the direction denoted by the arrow M in FIG. 16, 17, 20 or 21. By the cooperation of the second button driving part 8361 with the second linking follower 8362 of the second linking part 836*b*, the second button 836*a* drives the second linking part 836*b* to move such that the second latch 86 is disengaged from the second connection part 82, so that the second linking part 836*b* drives the second latch 86 to be disengaged from the second engaging slot 822 of the second connection part 82. The second latch 86 is always located in the second engaging slot 8332 of the operation part 833, as shown by FIG. 22 or 23.

Afterwards, the handle 837 is rotated in the direction denoted by the arrow N in FIG. 16 or FIG. 17. The rotating handle 837 will drive the operation part 833 to pivot relative to the supporting part 85. By the cooperation of the operation driving part 8331 with the pushing follower 8322, the pivoting operation part 833 pushes the first pushing part 832 to move in the guiding slot 851 in a direction away from the first engaging slot 811 of the first connection part 81, so that the first latch 84 is driven by the first pushing part 832 to be disengaged from the first engaging slot 811 of the first connection part 81. The first latch 84 is always located in the first engaging slot 821 of the second connection part 82, so that the first latch 84 releases the locking to the pivotal rotation of the first connection part 81 and the second connection part 82, so as to allow pivoting of the stroller handle 20 and the supporting leg 30.

By the above operation steps, the joint device 80 of the embodiment is transferred from the locking status to the unlocking status. Afterward, the stroller handle 20 can be rotated in the direction denoted by the arrow K in FIG. 16 such that the stroller handle 20 rotates about the pivotal connection point P2. The rotating stroller handle 20 drives the supporting leg 40 to rotate about the pivotal connection point P1 to further drive the upper end portions of the bottom frame 50 to rotate about the pivotal connection points P3 and the lower end portion of the bottom frame 50 to rotate about the pivotal connection point P4, so that the stroller 100' is gradually transferred from the unfolded status as shown by FIG. 16 to the folded status as shown by FIG. 24.

Figure 24:
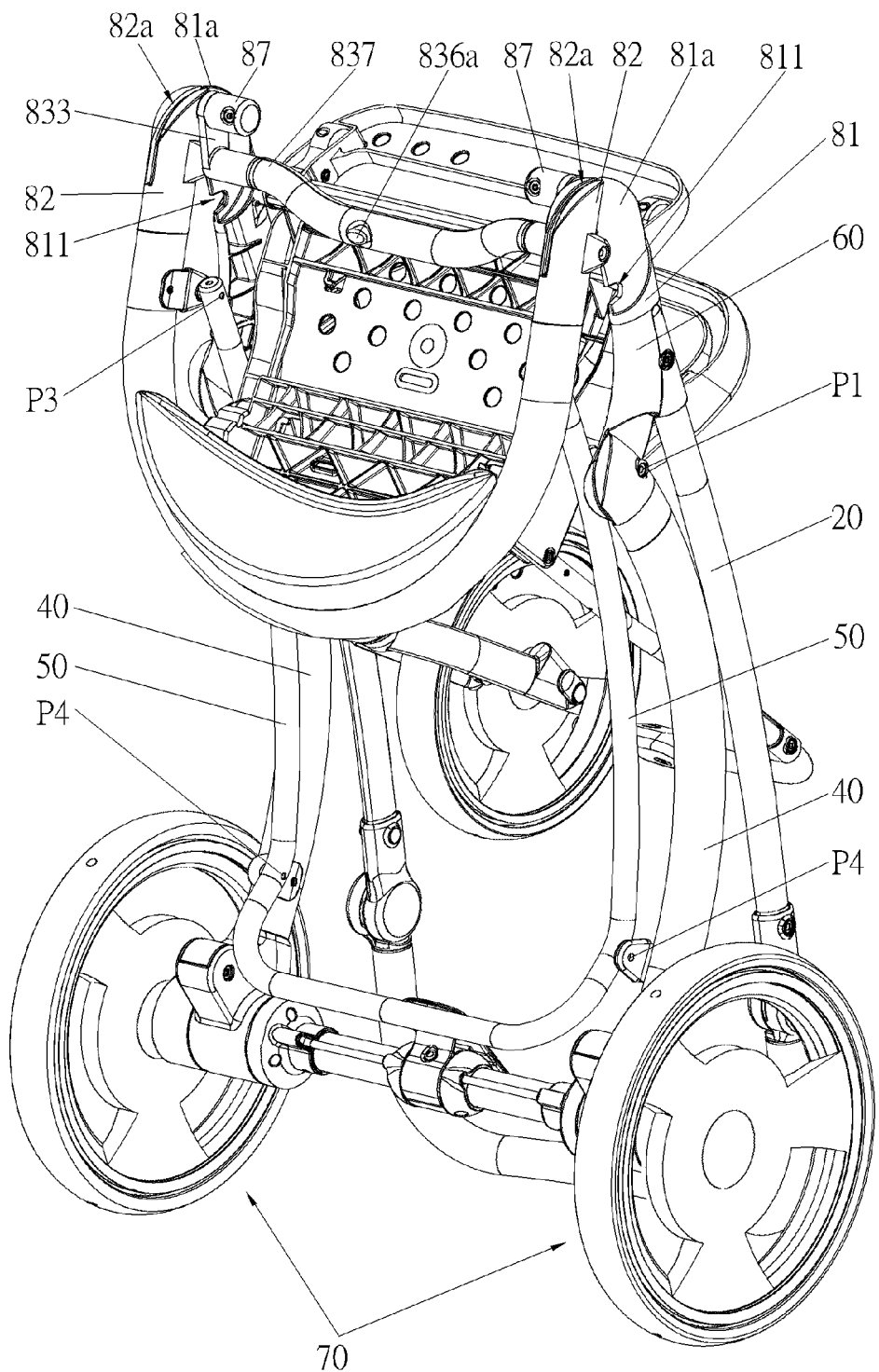
FIG. 24 is a perspective view of the stroller which is equipped with the joint devices of the second embodiment according to the invention and is folded completely with the joint devices being at the locking status.

When the stroller handle 20, the supporting leg 30, the supporting legs 40, and the bottom frame 50 are at the folded status as shown by FIG. 24, and the handle 837 drives operation part 833 to pivot back to the original position, the pressing on the second button 836*a* can be released so that the second resilient part 834 drives the second latch 86 to be engaged with the second engaging slot 822 of the second connection part 82. At the same time, the second latch 86 engaged with the second engaging slot 822 of the second connection part 82 pulls the second linking part 836*b* to move back to its original position. By the cooperation of the second linking follower 8362 with the second button driving part 8361, the restored second linking part 836*b* drives the second button 836*a* to move back to its original position.

Figure 20:
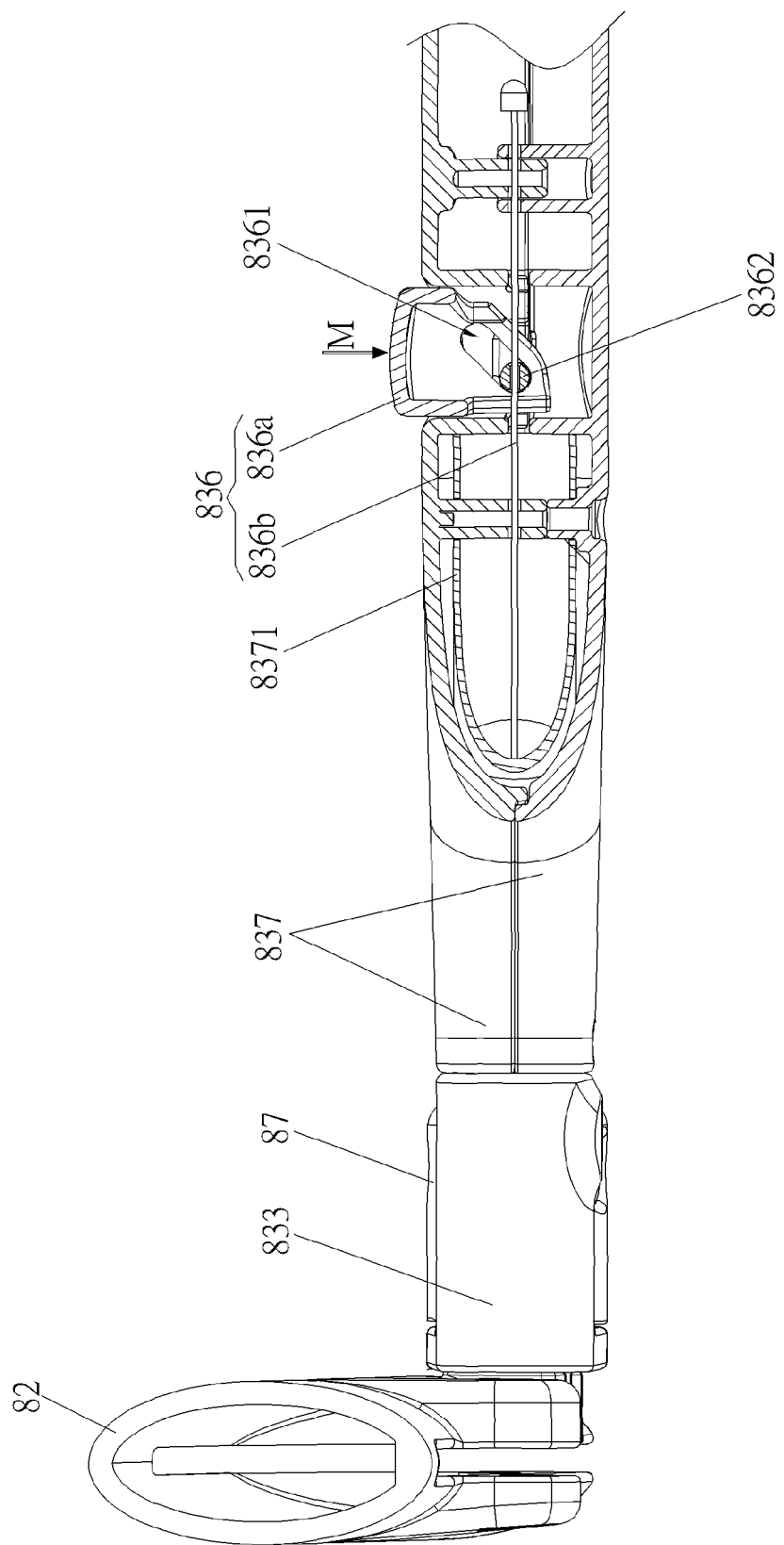
FIG. 20 is a sectional view of the joint device at the locking status of the second embodiment according to the invention.

Therefore, the joint device 80 of the embodiment is transferred from the unlocking status to the locking status as shown in FIG. 20 or FIG. 21. The folding operation on the stroller 100' is therefore completed.

Figure 25:
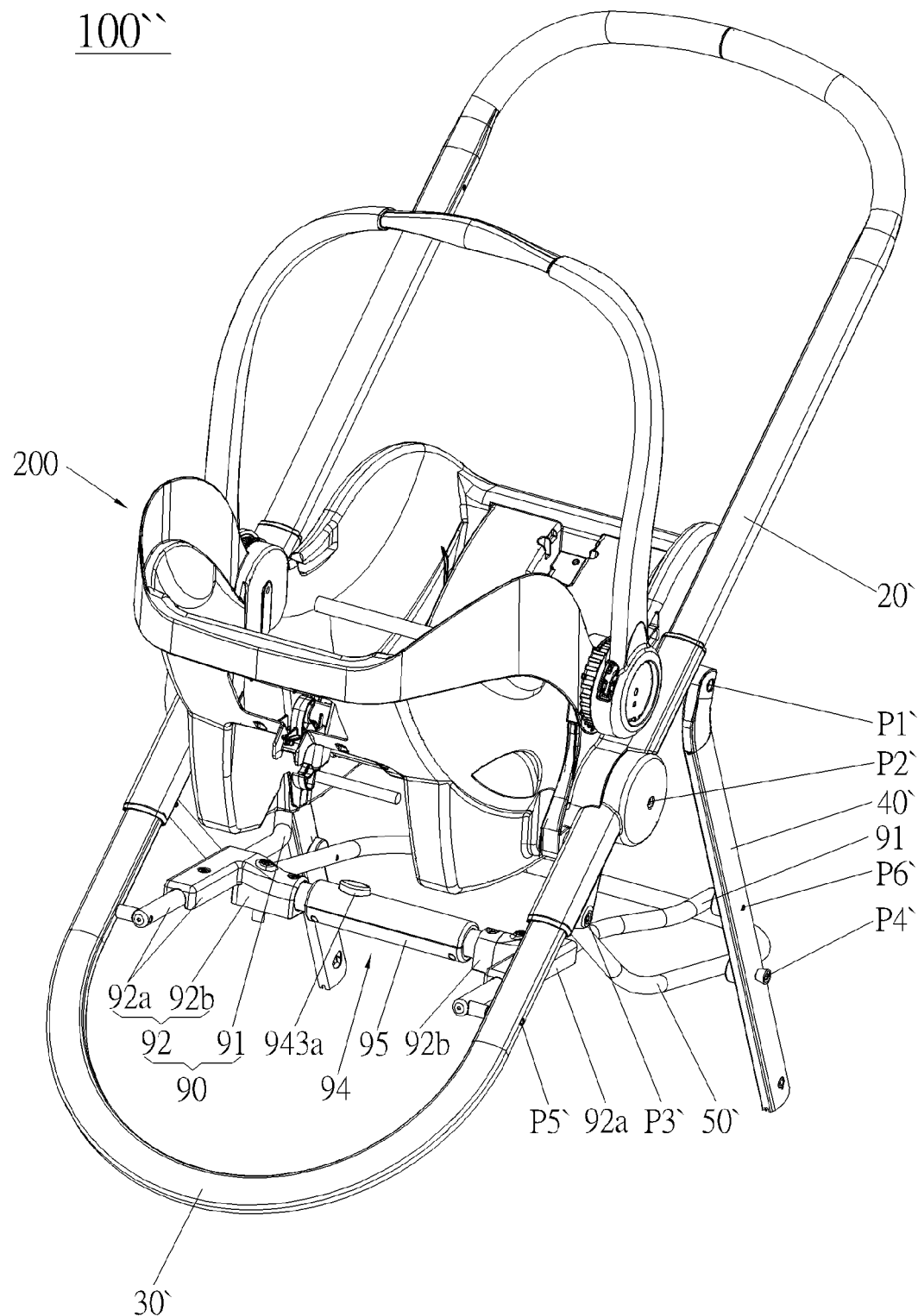
FIG. 25 is a perspective view of a stroller which is equipped with an infant carrier and two joint devices of a third embodiment according to the invention and is unfolded completely with the joint devices being at a locking status.
Figure 26:
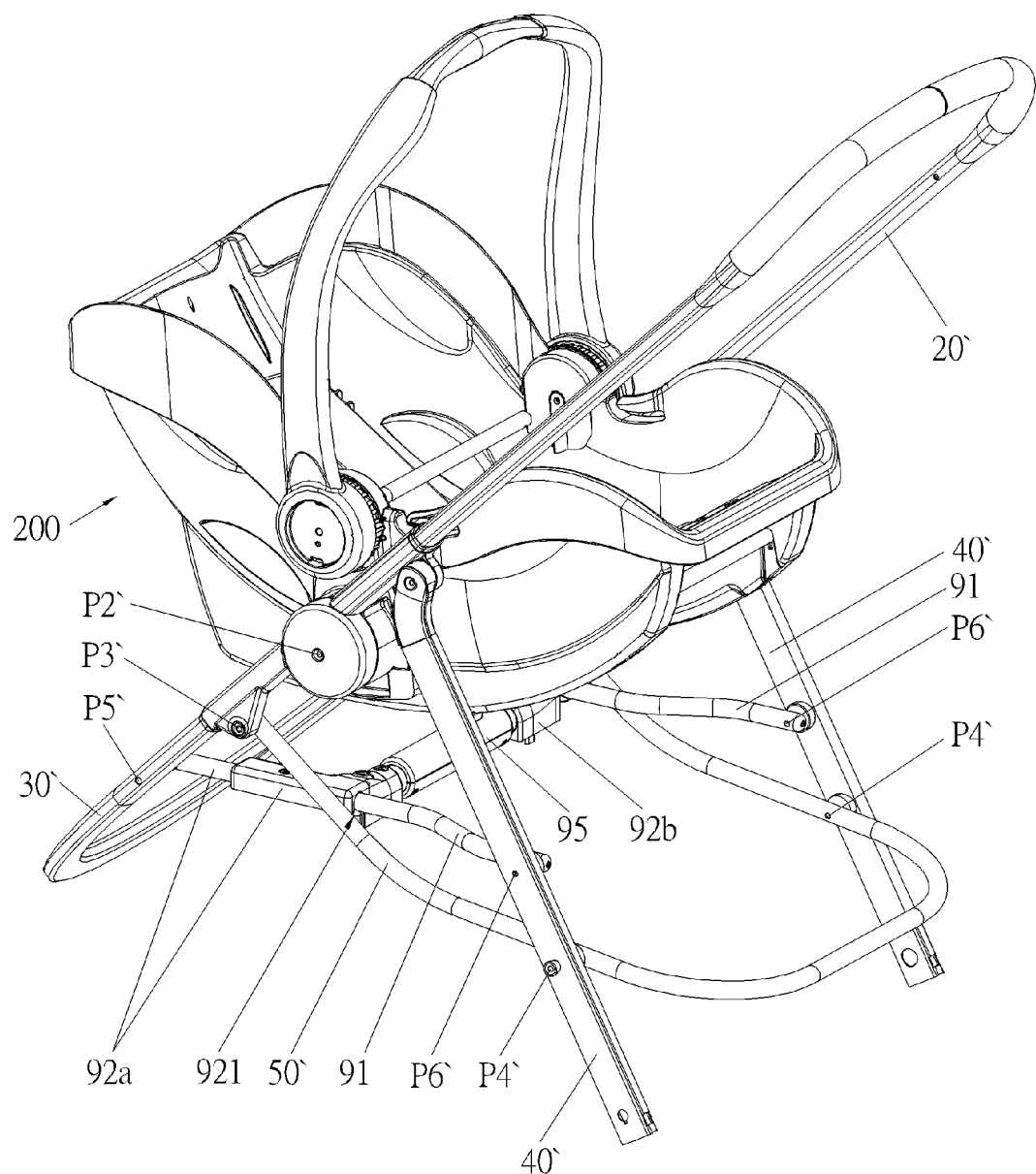
FIG. 26 is another perspective view of the stroller which is equipped with the infant carrier and the joint devices of the third embodiment according to the invention and is unfolded completely with the joint devices being at the locking status.
Figure 27:
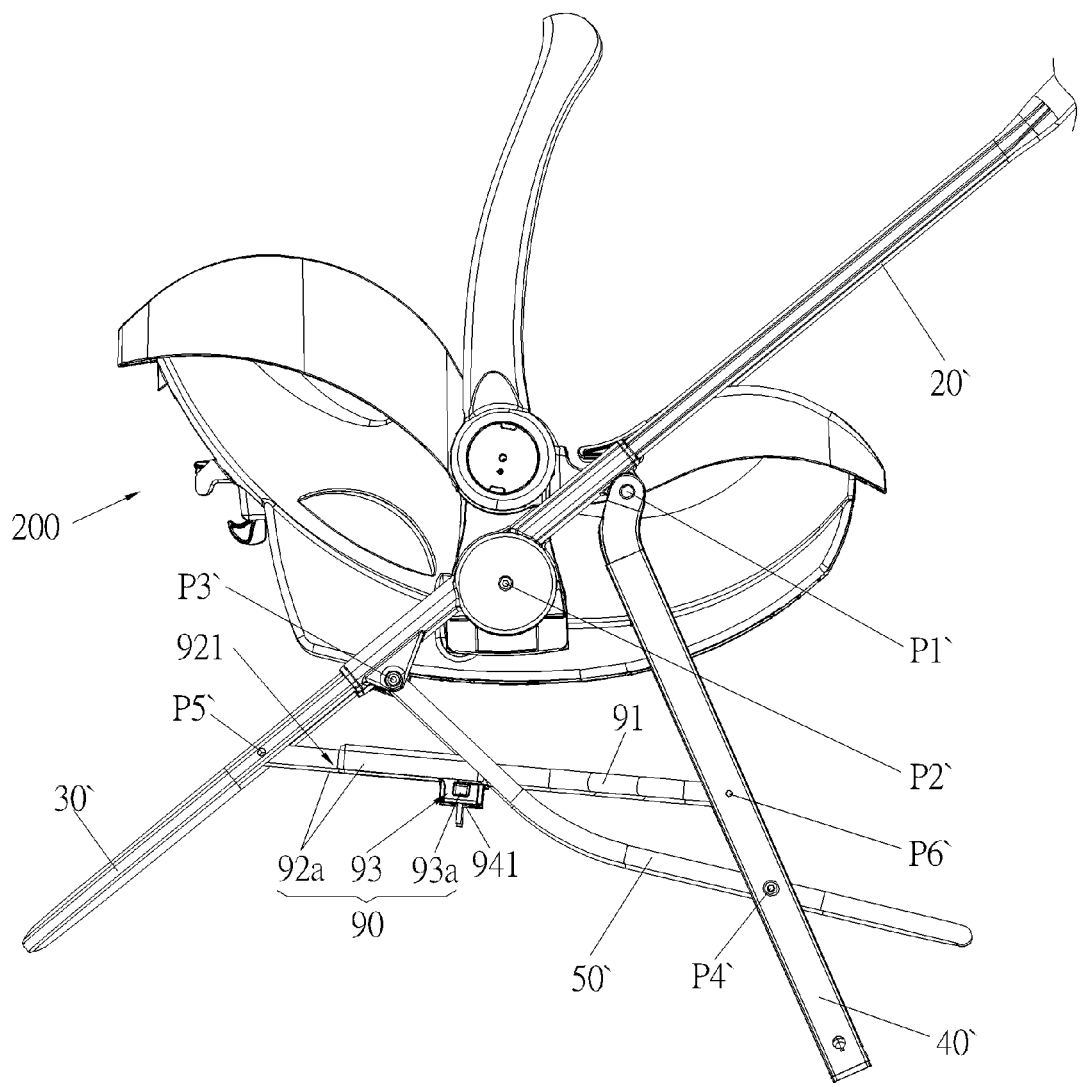
FIG. 27 is a side view of the stroller which is equipped with the infant carrier and the joint devices of the third embodiment according to the invention and is unfolded completely with the joint devices being at the locking status.

Please refer FIG. 25, which illustrates a stroller 100" equipped with two joint devices 90 of a third embodiment according to the invention. The stroller 100" includes a stroller handle 20', a supporting leg 30' capable of pivoting relative to the stroller handle 20', and the joint devices 90 of the embodiment. In practice, the stroller 100" further includes two supporting leg 40' capable of pivoting relative to the stroller handle 20', and a bottom frame 50' pivotally connected to the supporting leg 30' and the supporting legs 40'. An external infant carrier 200 is detachably assembled on the stroller 100". Therein, the stroller handle 20' and the supporting leg 30' are pivotally connected where two pivotal connection points P2' are formed respectively. An upper end portion of the supporting leg 40' and the stroller handle 20' are pivotally connected where a pivotal connection point P1' is formed so as to pivotally connect the stroller handle 20' and the supporting leg 40' and provide required space for pivotal rotation of the stroller handle 20' and the supporting leg 40'. The bottom frame 50' is disposed to be slanted up and down. Two upper end portions of the bottom frame 50' are pivotally connected to the two supporting legs 30' respectively where two pivotal connection points P3' are formed respectively. A lower end portion of the bottom frame 50' is pivotally connected to the supporting legs 40' where two pivotal connection points P4' are formed respectively. When the stroller 100" of the embodiment is unfolded completely, the pivotal connection point P3' and the pivotal connection point P2' are located between the pivotal connection point P4' and the pivotal connection point P1' in a height direction, the pivotal connection point P3' and the pivotal connection point P2' are located in front of the pivotal connection point P1' and the pivotal connection point P4', and the pivotal connection point P2' is located higher than the pivotal connection point P3' in the height direction and behind the pivotal connection point P3', so as to facilitate folding each other of the stroller handle 20', the supporting leg 30', the supporting legs 40', and the bottom frame 50'. The stroller 100" will be described in detail in the following.

Please refer to FIGS. 26 through 34. The joint device 90 includes a first latch 93, an actuating mechanism 94, and two connection parts 91 and 92 pivotally connected to each other. For convenience in description, the two connection parts 91 and 92 are assigned to be a first connection part 91 and a second connection part 92 respectively. In practice, in the embodiment, when the stroller 100" is unfolded completely, the first connection part 91 and the second connection part 92 are disposed to be slanted up and down on the stroller 100". Preferably, the front end portion of the second connection part 92 and the supporting leg 30' are pivotally connected where a pivotal connection point P5' is formed. The pivotal connection point P5' is located below the pivotal connection point P3' in the height direction and also in front of the pivotal connection point P3'. A rear end portion of the first connection part 91 and the supporting leg 40' are pivotally connected where a pivotal connection point P6' is formed. The pivotal connection point P6' is located between the pivotal connection point P1' and the pivotal connection point P4' in the height direction and also behind the pivotal connection point P2'.

Figure 34:
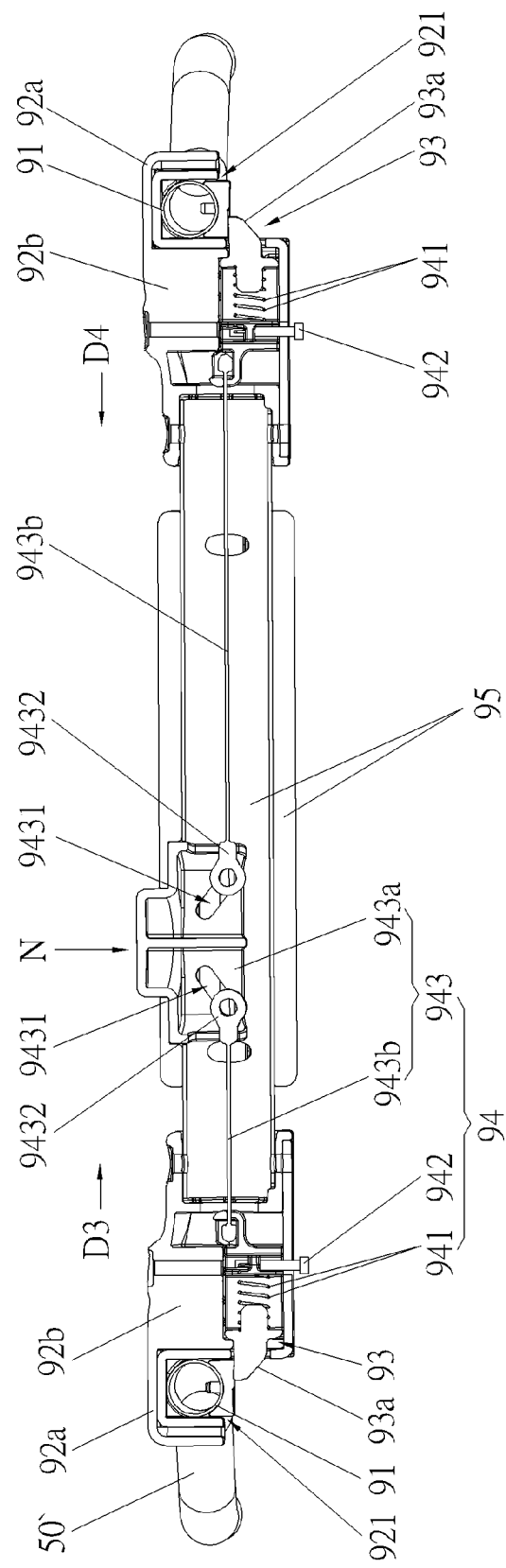
FIG. 34 is a sectional view of the joint device at the locking status of the third embodiment according to the invention.

A front end portion of the first connection part 91 is pivotally connection to a rear end of the second connection part 92. When the stroller 100" is unfolded completely, the first connection part 91 and the second connection part 92 are connected in a line, for facilitating a coordinate operation of folding and unfolding the first connection part 91, the supporting leg 30', the supporting leg 40' when the stroller 100" is folded and unfolded. The first latch 93 can be selectively moved to a first locking position (as shown by FIG. 34) of locking the first connection part 91 and the second connection part 92 or a first unlocking position of unlocking the first connection part 91 with the second connection part 92. Preferably, the first latch 93 can be selectively moved to the first locking position (as shown by FIG. 34) of locking pivotal rotation of the first connection part 91 and the second connection part 92 or the first unlocking position of unlocking the first connection part 91 and the second connection part 92. Optionally, the second connection part 92 includes a lateral portion 92a disposed toward a forward direction and a longitudinal portion 92b in a side-to-side direction. A front end portion of the lateral portion 92a and the supporting leg 30' form the pivotal connection point P5'. Preferably, the longitudinal portion 92b is vertically fixedly connected to a rear portion of the lateral portion 92a. A front end of the first connection part 91 is pivotally connected to the lateral portion 92a, for facilitating relatively pivoting of the first connection part 91 and the second connection part 92.

Figure 28:
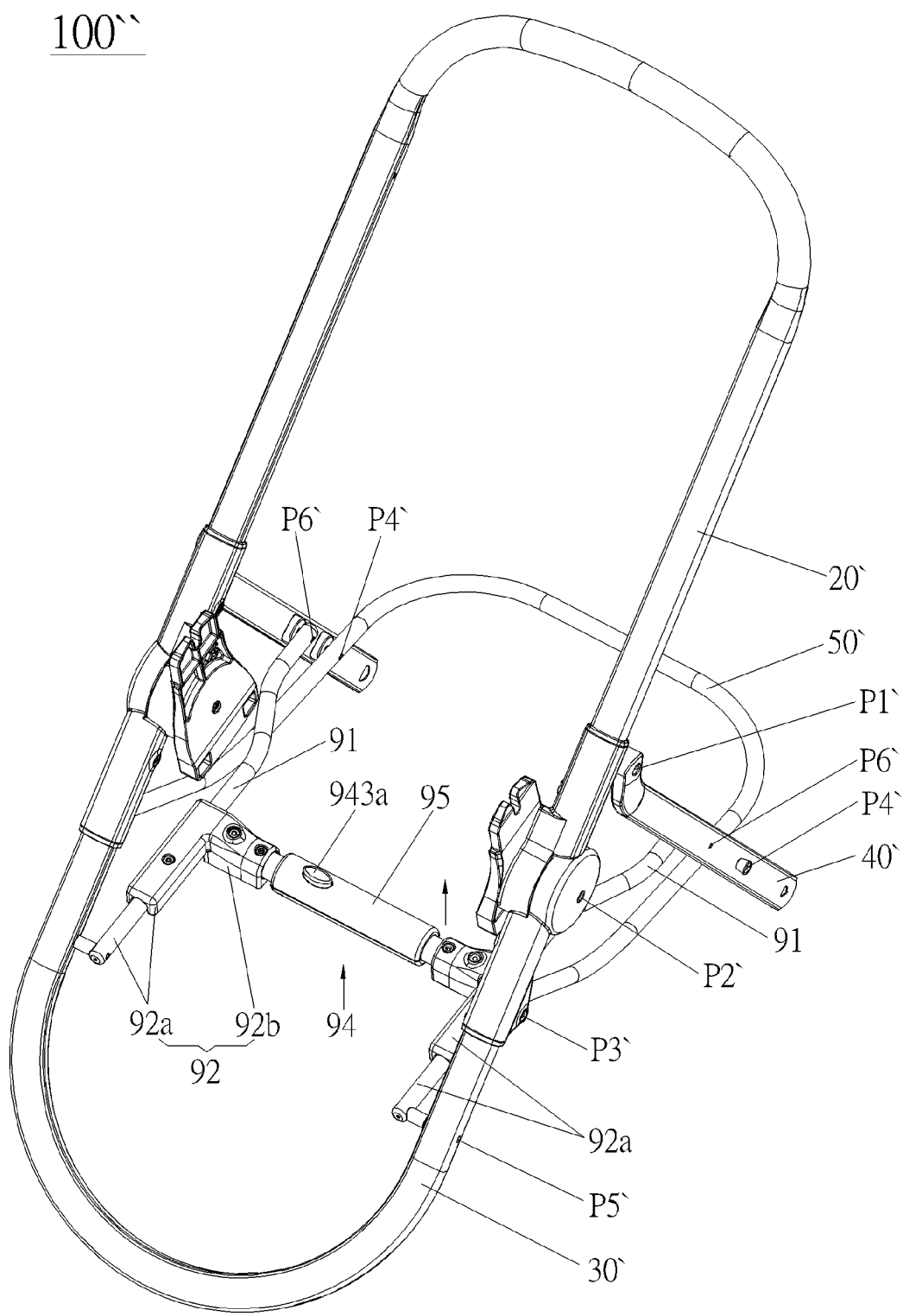
FIG. 28 is a perspective view of the stroller which is equipped with the joint devices of the third embodiment according to the invention and is unfolded completely with the joint devices being at the locking status.

As shown by FIG. 28, the actuating mechanism 94 is disposed adjacent to where the first connection part 91 and the second connection part 92 are pivotally connected. The actuating mechanism 94 is connected to the first latch 93 to be operable to selectively move the first latch 93 to the first locking position shown in FIG. 34 or the first unlocking position. In practice, as shown by FIG. 24, when the first latch 93 is located at the first locking position, the first connection part 91 is held between the first latch 93 and the second connection part 92. In practice, the first connection part 91 is held between the first latch 93 and the lateral portion 92a of the second connection part 92, for performing a reliable locking to the first connection part 91. Certainly, by an actual requirement, the second connection part 92 can be designed to be held between the first latch 93 and the first connection part 91; when the first latch 93 is located at the first unlocking position, the first latch 93 is disengaged from the first connection part 91. Certainly, by an actual requirement, the first latch 93 can designed to be disengaged from both the first connection part 91 and the second connection part 92. The more details will be described in the following.

In the embodiment, a first pivotal plane is formed between the first connection part 91 and the lateral portion 92a of the second connection part 92; that is, the first pivotal plane is the plane where the pivotal rotation of the first connection part 91 and the lateral portion 92a of the second connection part 92 occurs. A movement direction (i.e. the side-to-side direction of FIG. 34) of the first latch 93 intersects the first pivotal plane, so that the first latch 93 can perform the locking and unlocking to the pivotal rotation of the first connection part 91 and the second connection part 92 in the intersection direction. In practice, a first pivotal axis is formed between the first connection part 91 and the lateral portion 92a of the second connection part 92; that is, the first pivotal axis is the rotation center line around which the first connection part 91 and the lateral portion 92a of the second connection part 92 pivot relative to each other. The movement direction of the first latch 93 is parallel to the first pivotal axis. Preferably, the movement direction of the first latch 93 is shifted relative to the first pivotal axis; that is, a center line of the first latch 93 in the movement direction and the first pivotal axis are not located at the same line, so as to simplify the configuration of the first latch 93 relative to the first connection part 91 and the second connection part 92. Accordingly, the lateral portion 92a of the first connection part 92 has a pivot shaft matching with the pivot hole. The pivot shaft is inserted in coordination into the pivot hole for achieving the pivotal rotation of the first connection part 91 and the lateral portion 92a of the second connection part 92, so that the pivotal connection of the first connection part 91 and the lateral portion 92a of the second connection part 92 is more simple and reliable. Certainly, by an actual requirement, it is practicable that the pivot hole is disposed on the lateral portion 92a of the second connection part 92 while the pivot shaft is disposed on the first connection part 91, which also can perform the pivotal connection of the first connection part 91 and the lateral portion 92a of the second connection part 92. The lateral portion 92a of the second connection part 92 has an opening slot 921 for the first connection part 91 to rotate into the lateral portion 92a of the second connection part 92 when the stroller 100" is unfolded completely; therefore, when the stroller 100" is unfolded completely, the first connection part 91 is straightly connected to the lateral portion 92a of the second connection part 92 in a straight line. Such configuration makes the joint device 90 of the embodiment simpler.

Furthermore, the actuating mechanism 94 includes a first resilient part 941 urging against the first latch 93. Preferably, the actuating mechanism 94 further includes a riveting part 942. The first resilient part 941 pushes the first latch 93 so that the first latch 93 has a tendency to move to the first locking position as shown by FIG. 34. In practice, in the embodiment, the first resilient part 941 is resiliently compressed to be disposed between the riveting part 942 and the first latch 93.

Furthermore, the actuating mechanism 94 further includes a first button component 943 connected to the first latch 93. Preferably, the first button component 943 is connected to the first latch 93 in a remote place. The first button component 943 includes a first button 943a and a first linking part 943b connecting the first button 943a and the first latch 93. The first button 943a can be pressed (e.g. in the up-to-down direction in FIG. 34) to drive the first linking part 943b to pull the first latch 93 to move, for convenience of a user to operate in a distance from the first latch 93.

Therein, for convenience of the installation of the first button component 943, the joint device 90 of the embodiment further includes a supporting part 95 fixedly connected to the second connection part 92. In practice, the supporting part 95 is fixedly connected to the longitudinal portion 92b of the second connection part 92. Certainly, by an actual requirement, the supporting part 95 can be alternatively fixedly connected to the first connection part 91. The first button 943a is movably disposed on the supporting part 95 and includes a first button driving part 9431. Preferably, the first button driving part 9431 is a slanted sliding slot, for simplifying the structure of the first button driving part 9431. The extension plane of the first button driving part 9431 intersects the movement direction of the first latch 93. The first linking part 943b includes a first linking follower 9432 matching with the first button driving part 9431. Preferably, the first linking follower 9432 is a post structure, for simplifying the structure of the first linking follower 9432. The post structure is disposed to pass through the slanted sliding slot with a gap therebetween. The first button driving part 9431 can be pressed to drive the first linking follower 9432 so that the first button 943a moves the first latch 93 by the first linking part 943b better.

On an association of FIGS. 25 through 34, the unfolding and folding of the stroller 100" equipped with the joint device 90 of the third embodiment will be described in detail in the following. When the stroller 100" in FIG. 25, which is unfolded completely, is required to be folded to be the stroller 100" in FIG. 34, which is folded completely, the infant carrier 200 is first to be taken off. Then, a user can press the first button 943a in the direction denoted by the arrow N in FIG. 34, so that the first button 943a slides on the supporting part 95. By the cooperation of the first button driving part 9431 and the first linking follower 9432, the sliding first button 943a drives the two first latches 93 at the two sides to move in the directions denoted by arrows D3 and D4 in FIG. 34 respectively, so that the first latch 93 moves in a direction approaching the longitudinal portion 92b of the second connection part 92 till the first connection part 91 is disengaged from the first latch 93 and the lateral portion 92a of the second connection part 92. The pivotal rotation of the first connection part 91 and the second connection part 92 is therefore available.

Figure 29:
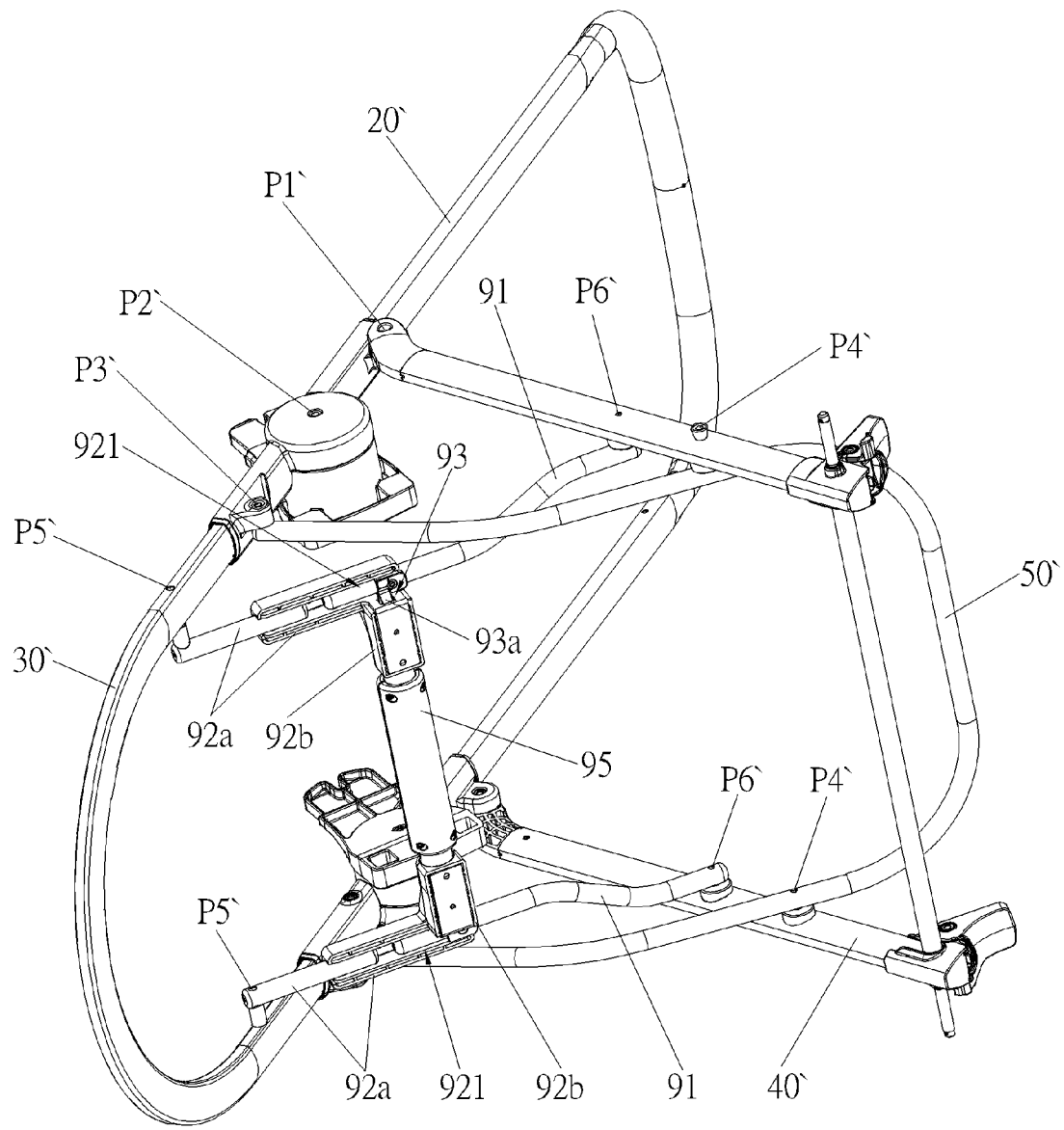
FIG. 29 is another perspective view of the stroller which is equipped with the joint devices of the third embodiment according to the invention and is unfolded completely with the joint devices being at the locking status.
Figure 30:
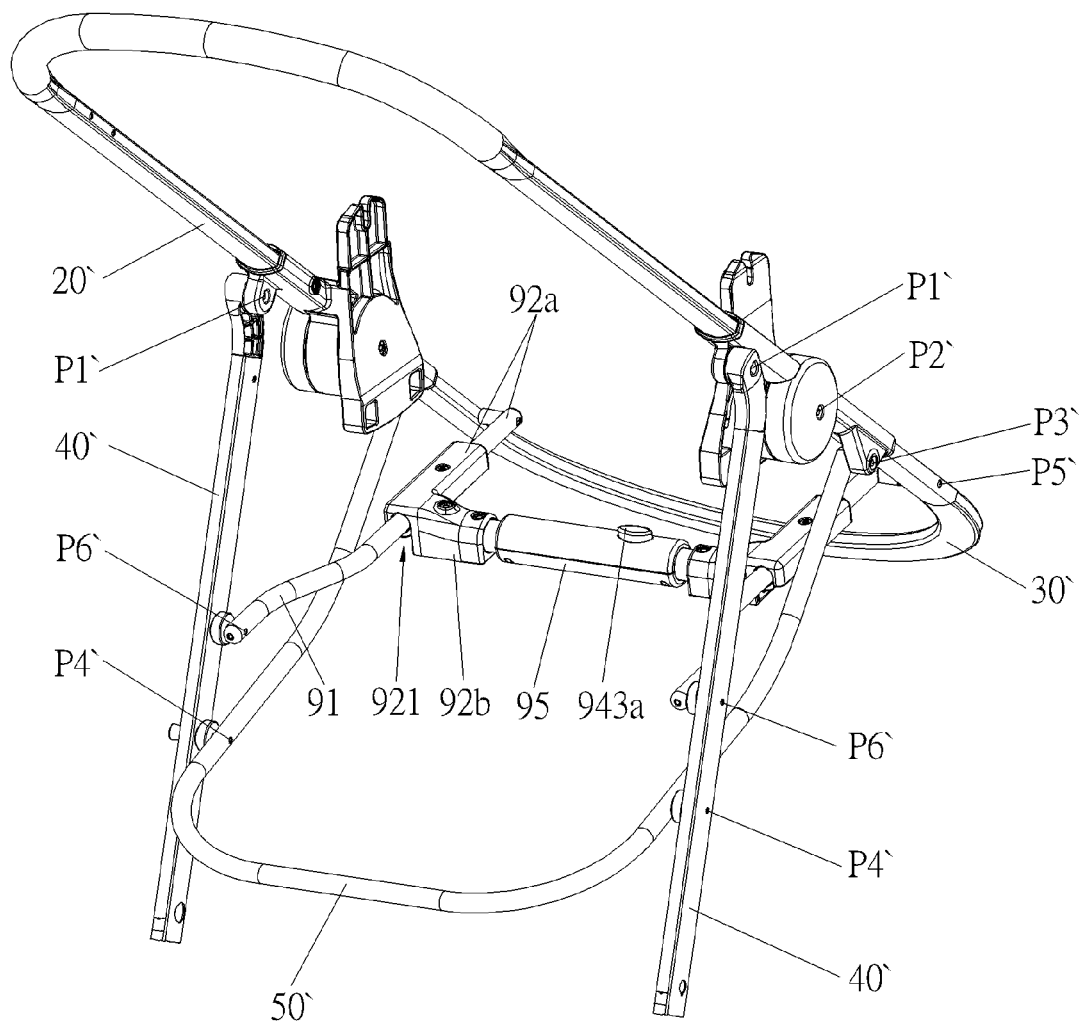
FIG. 30 is another perspective view of the stroller which is equipped with the joint devices of the third embodiment according to the invention and is unfolded completely with the joint devices being at the locking status.
Figure 31:
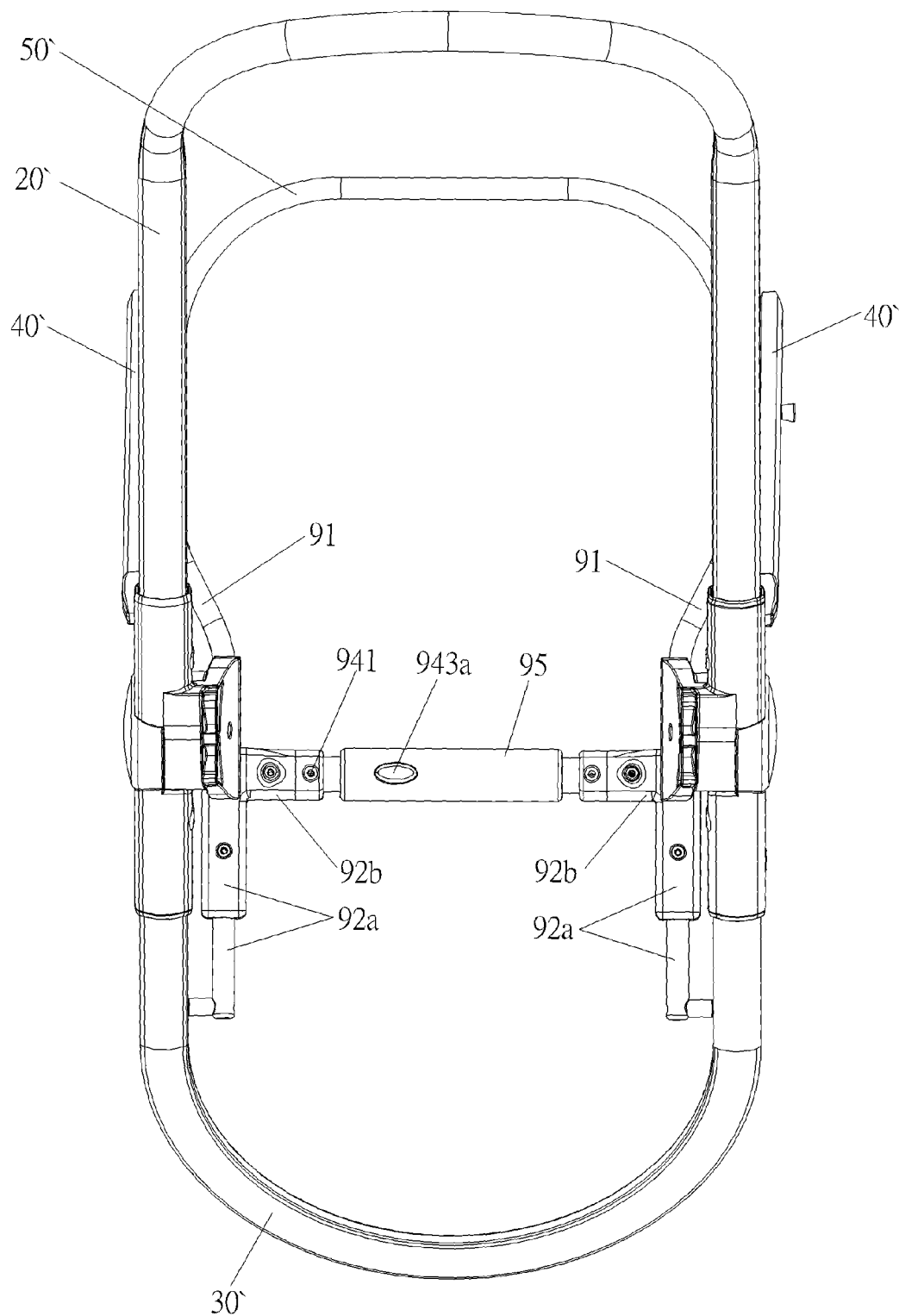
FIG. 31 is a top view of the stroller in FIG. 30.
Figure 32:
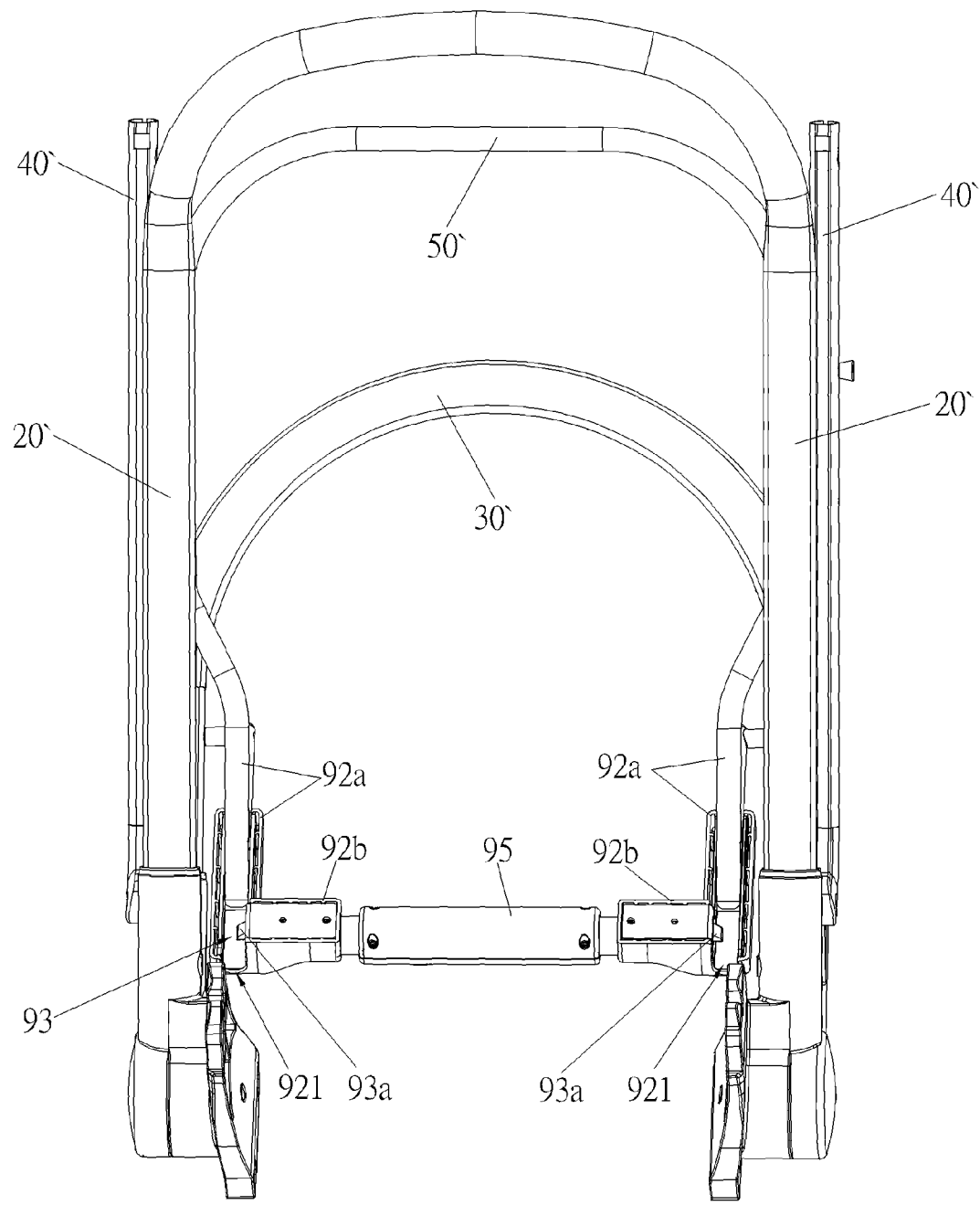
FIG. 32 is a bottom view of the stroller in FIG. 30.
Figure 33:
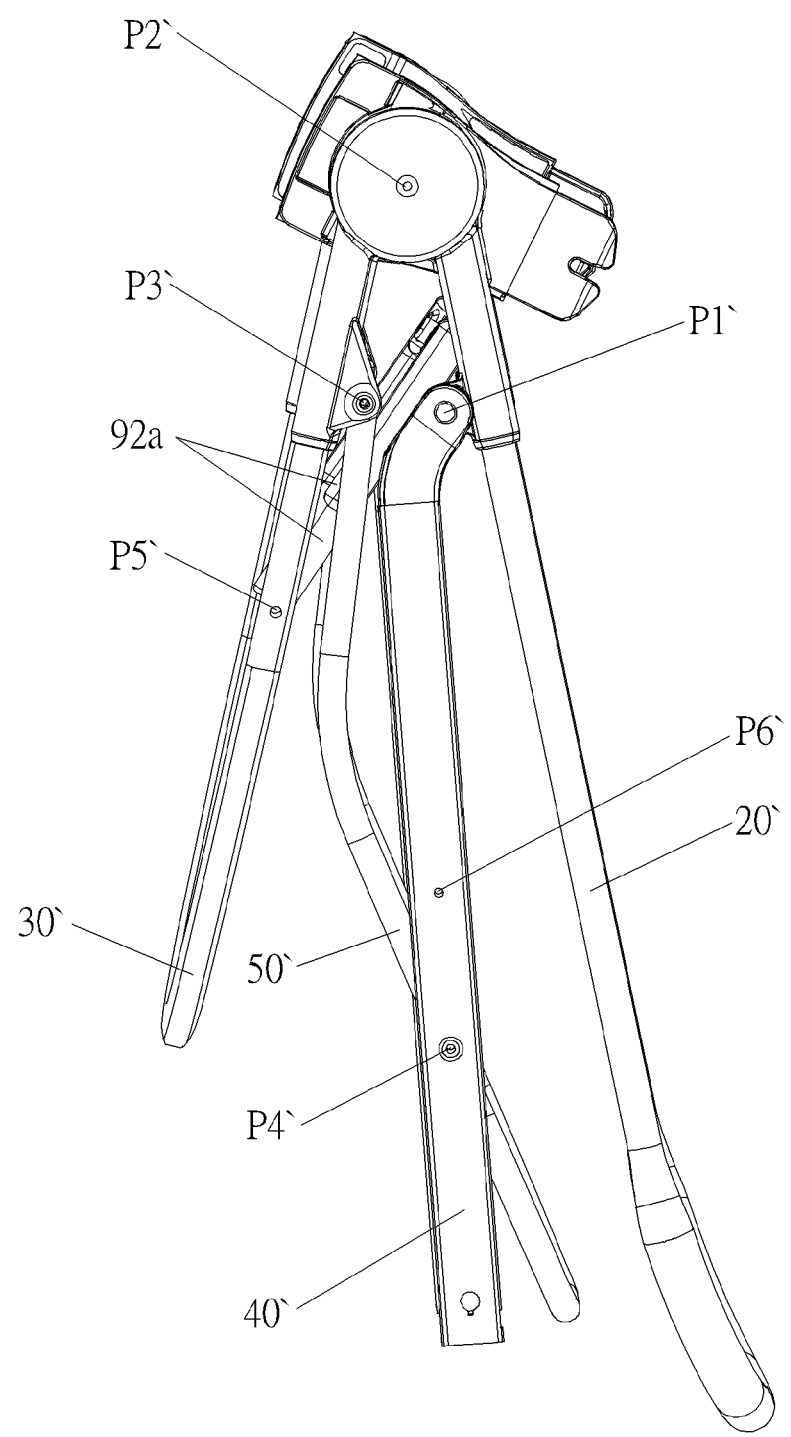
FIG. 33 is a side view of the stroller which is equipped with the joint devices of the third embodiment according to the invention and is folded completely with the joint devices being at the locking status.

By the above operation steps, the joint device 90 of the embodiment is transferred from the locking status to the unlocking status. Afterward, under the condition of the first button 943a being pressed, the supporting part 95 can be pulled in the direction denoted by an arrow near the supporting 95 in FIG. 28, so that the supporting part 95 drives the lateral portion 92a of the second connection part 92 through the longitudinal portion 92b of the second connection part 92 to rotate about the pivotal connection point P5' relative to the first connection part 91. The rotating lateral portion 92a drives the supporting leg 30' to rotate backward in the view of FIG. 28 about the pivotal connection point P2' and drives the supporting leg 40' to rotate forward in the view of FIG. 28 about the pivotal connection point P1', so that the supporting leg 30' and the supporting leg 40' approach each other. When the rotating supporting leg 40' drives the stroller handle 20' to rotate backward and downward in the view of FIG. 28 about the pivotal connection point P2', the supporting leg 40' also drives the lower end portion of the bottom frame 50' to rotate backward and upward in the view of FIG. 28 about the pivotal connection point P3', so that the stroller 100" is gradually transferred from the unfolded status as shown by FIG. 28, 29 or 30 to the folded status as shown by FIG. 33. When the stroller handle 20', the supporting leg 30', the supporting legs 40', and the bottom frame 50' are at the folded status as shown by FIG. 33, the first latch 93 is moved back to below the first connection part 91. Furthermore, the first linking part 943b is also driven by the first latch 93 to move toward the first connection part 91, so that the moving first linking part 943b pulls the first button 943a to be restored through the first linking follower 9432 and the first button driving part 9431. Therefore, the folding operation of the stroller 100" is complete.

As shown by FIG. 33, when the folded stroller 100" is required to be unfolded, a user can pull the stroller handle 20' and the supporting leg 30' by two hands, such that the supporting leg 30' is rotated in a clockwise direction of FIG. 33 so as to rotate the stroller handle 20' in a counterclockwise direction of FIG. 33. The rotating supporting leg 30' drives the upper end portion of the bottom frame 50' to rotate downward about the pivotal connection point P3' and also drives the lateral portion 92a of the second connection part downward, and the rotating stroller handle 20' drives the supporting leg 40' to rotate in the clockwise direction of FIG. 33. The rotating supporting leg 40' drives the lower end portion of the bottom frame 50' to rotate in the counterclockwise of FIG. 33, so that the first connection part 91 is rotated toward the lateral portion 92a of the second connection part 92 to be accommodated in the opening slot 921 of the lateral portion 92a.

Preferably, because the first resilient part 941 pushes the first latch 93, and the first latch 93 has a chamfer structure 93a, the first connection part 91 can push the first latch 93 to retract into the longitudinal portion 92b of the second connection part 92 so that the first connection part 91 can rotate into the opening slot 921 till the first connection part 91 is entirely rotated into the opening slot 921 of the lateral portion 92a. At this moment, the first latch 93 protrudes the bottom of the first connection part 91 by the resilient force by the first resilient part 941, so that the first connection part 91 is held between the first latch 93 and the lateral portion 92a of the second connection part 92 when the stroller 100" is unfolded completely. The purpose of the unfolding operation of the stroller 100" is achieved.

Please refer to FIGS. 35 to 38, which illustrate a stroller 300 equipped with two joint devices 90' of a fourth embodiment according to the invention. The stroller 300 includes a stroller handle 310, a supporting leg 320 capable of pivoting relative to, a seat mechanism 340 installed on where the supporting leg 320 and the stroller handle 310 are pivotally connected, supporting legs 330 pivotally connected to the supporting leg 320, and the joint device 90' of the embodiment. In practice, the stroller 300 further includes a first linking part 350, a second linking part 360, and a third linking part 370 corresponding to each joint device 90'. The seat mechanism 340 includes a seat plate 341, a seat tube 342, and a dinner tray 343. The seat plate 341 is fixed on the seat tube 342. The dinner tray 343 is disposed across the seat plate 341 and two end portions thereof are fixedly on the seat plate 341. Preferably, the first linking part 350 is a sheet structure. An upper end portion of the first linking part 350 is pivotally connected to the stroller handle 310. A lower end portion of the first linking part 350 is fixed connected to the first connection part 91' of the joint device 90'. Preferably, the second linking part 360 is a sheet structure. An upper end portion of the second linking part 360 is pivotally connected to the dinner tray 343. A lower end portion of the second linking part 360 is pivotally connected to the third linking part 370. Preferably, the third linking part 370 is a tube structure. An upper portion of the third linking part 370 is pivotally connected to the seat tube 342 for facilitating unfolding and folding the stroller handle 310, the supporting leg 320, the seat mechanism 340, and the supporting legs 330 during unfolding and folding of the stroller 300. The more details will be described in the following.

Figure 35:
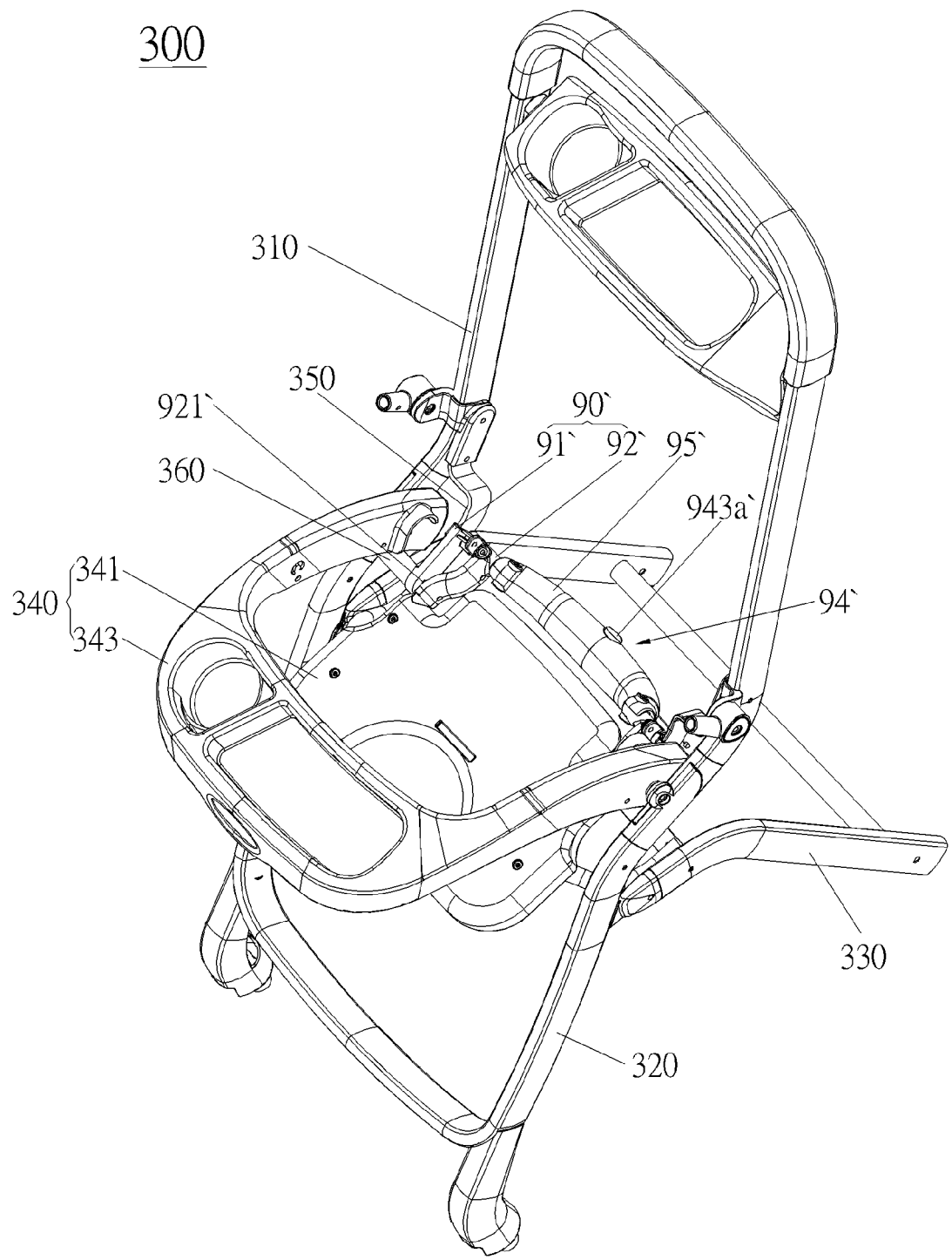
FIG. 35 is a perspective view of a stroller which is equipped with two joint devices of a fourth embodiment according to the invention and is unfolded completely with the joint devices being at a locking status.
Figure 36:
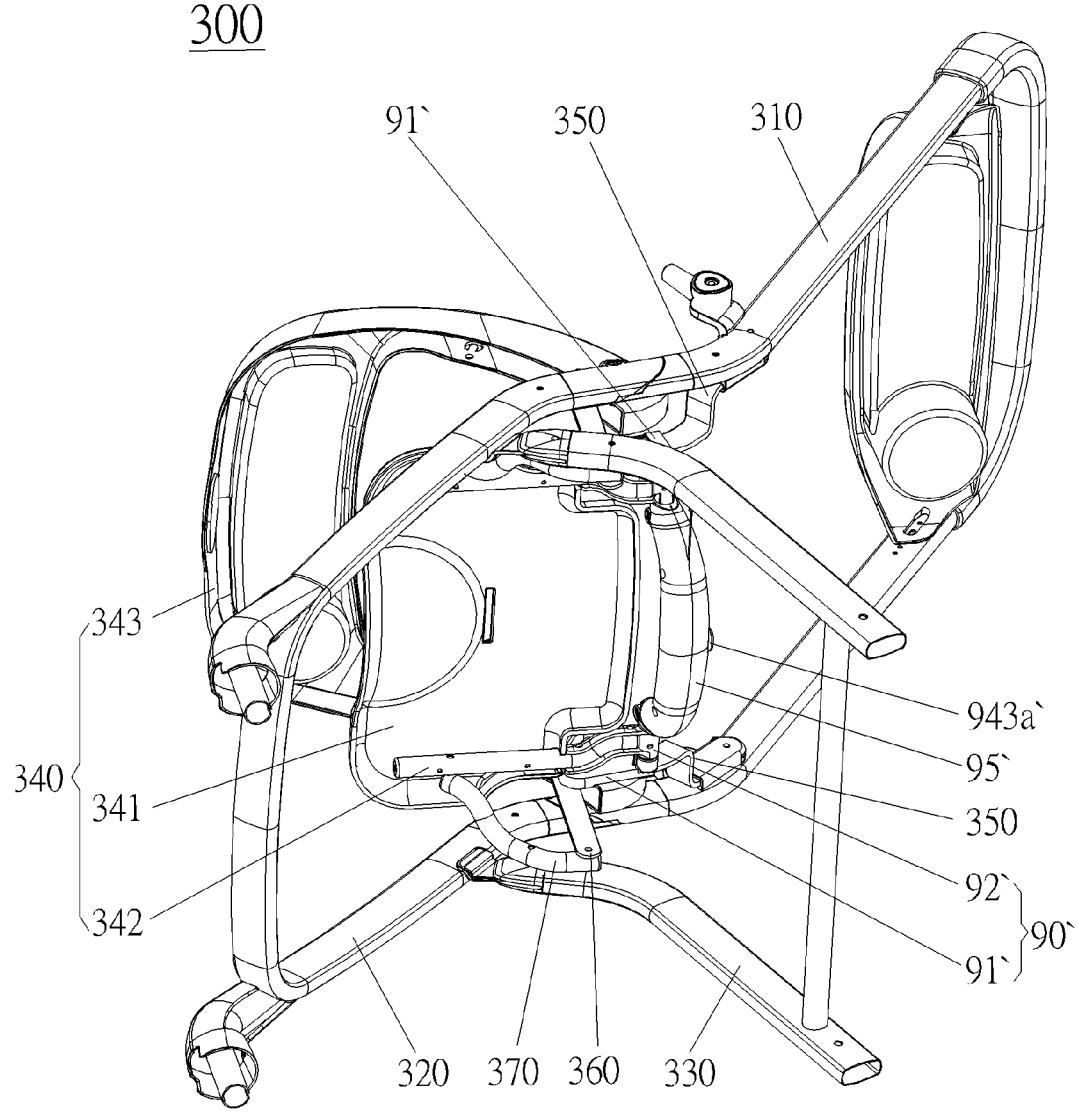
FIG. 36 is another perspective view of the stroller which is equipped with the joint devices of the fourth embodiment according to the invention and is unfolded completely with the joint devices being at the locking status.
Figure 37:
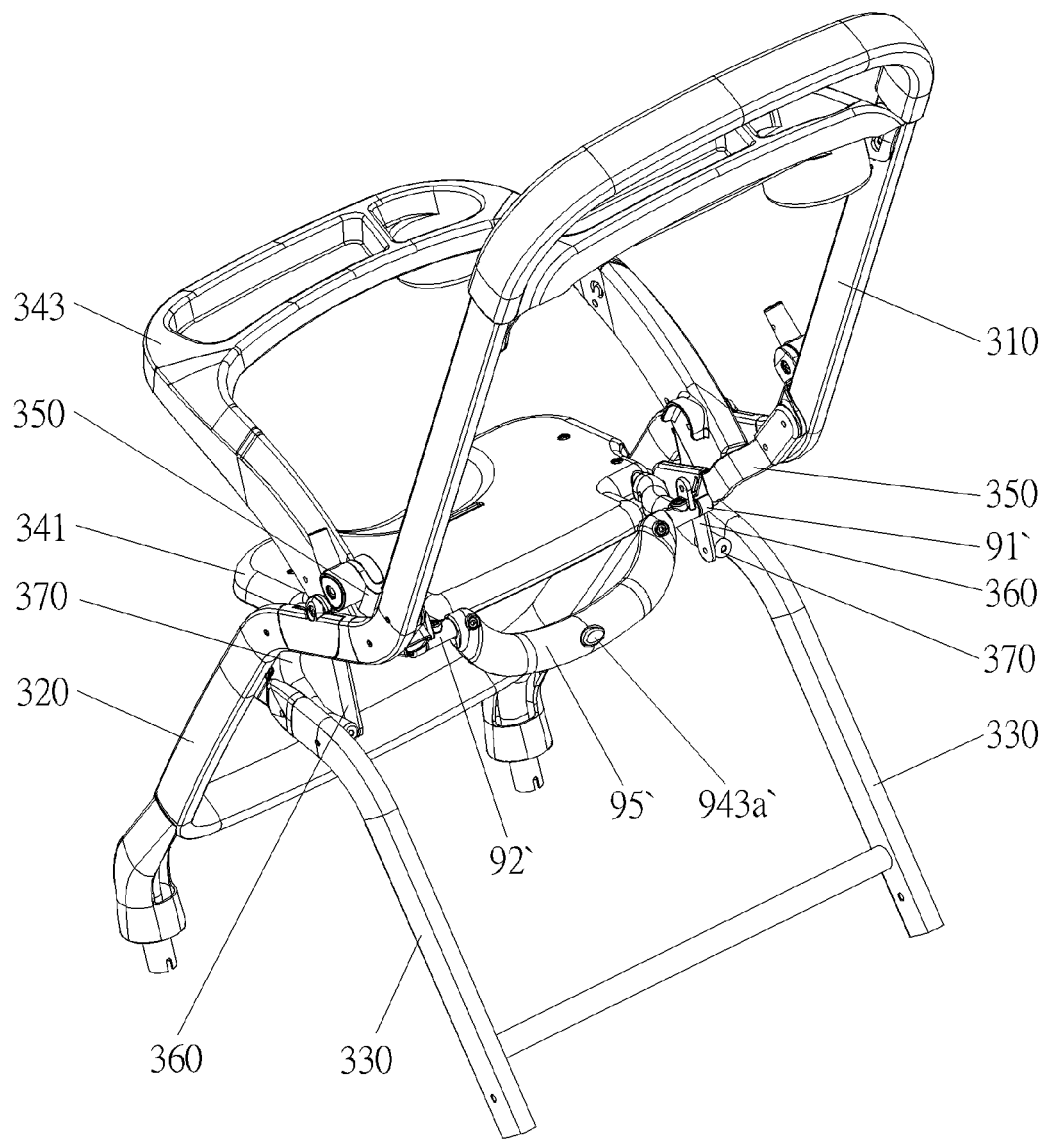
FIG. 37 is another perspective view of the stroller which is equipped with the joint devices of the fourth embodiment according to the invention and is unfolded completely with the joint devices being at the locking status.

The joint device 90' of the embodiment includes a first latch 93', an actuating mechanism 94' and two connection part 91' and 92' pivotally connected to each other. For convenience in description, the two connection parts 91' and 92' are assigned to be a first connection part 91' and a second connection part 92' respectively. In practice, in the embodiment, the first connection part 91' is fixed to the lower end portion of the first linking part 350. Certainly, by an actual requirement, the lower end portions of the second connection part 92' and the first linking part 350 are fixed to each other. The first latch 93' can be selectively moved to a first locking position (as shown by FIG. 35) of locking the first connection part 91' and the second connection part 92' or a first unlocking position of unlocking the first connection part 91' with the second connection part 92'. Preferably, the first latch 93' can be selectively moved to the first locking position of locking the pivotal rotation of the first connection part 91' and the second connection part 92' or the first unlocking position of unlocking the pivotal rotation of the first connection part 91' with the second connection part 92'. The actuating mechanism 94' is disposed adjacent to where the first connection part 91' and the second connection part 92' are pivotally connected. The actuating mechanism 94' is connected to the first latch 93' to be operable to selectively move the first latch 93' to the first locking position as shown in FIG. 35, 36, 37 or 38 or the first unlocking position. In practice, when the first latch 93' is located at the first locking position, the first latch 93' is engaged with both the first connection part 91' and the second connection part 92'. When the first latch 93' is located at the first unlocking position, the first latch 93' is disengaged from the first connection part 91'. Certainly, by an actual requirement, the first latch 93' can be designed to be disengaged from the second connection part 92' or from both the first connection part 91' and the second connection part 92'. The more detail will be described in the following.

Figure 39:
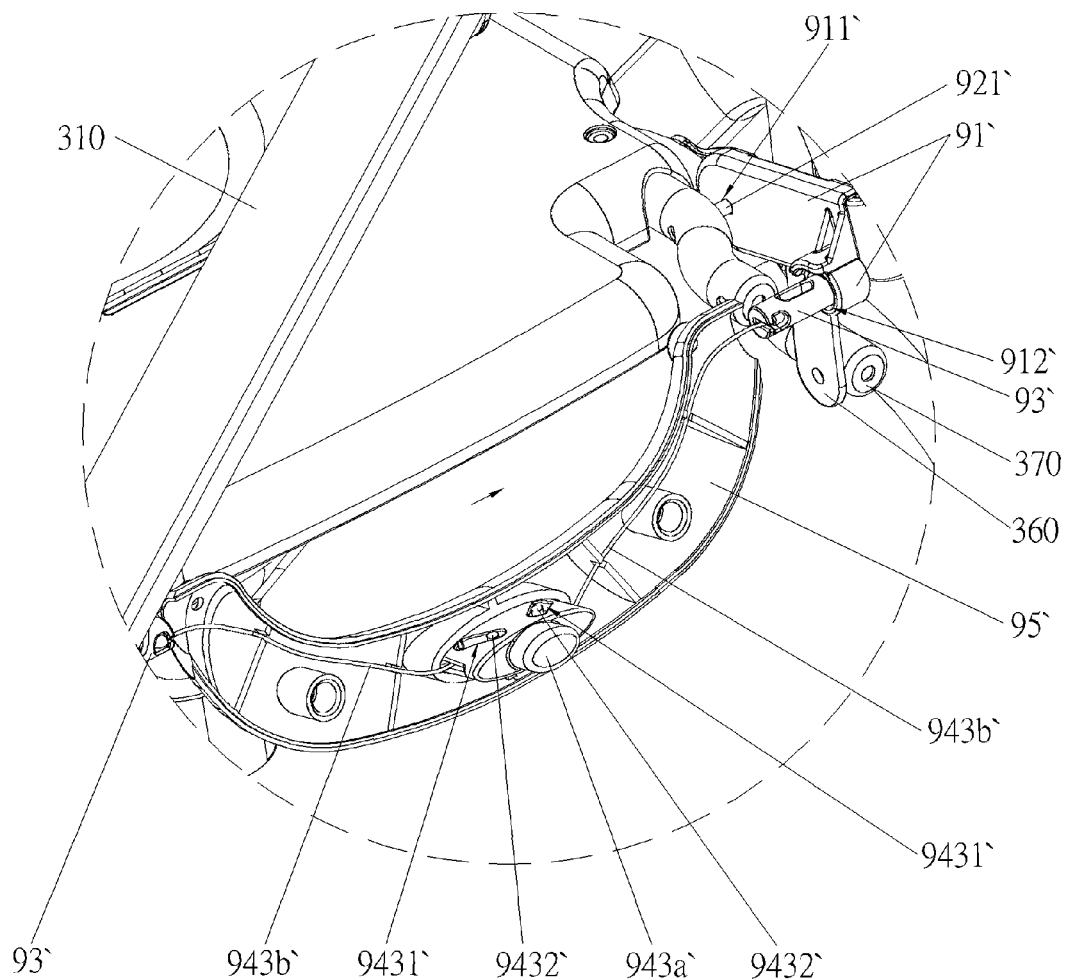
FIG. 39 is an enlarged view of the P portion in FIG. 38.

In the embodiment, a first pivotal plane is formed between the first connection part 91' and the second connection part 92'; that is, the first pivotal plane is the plane where the pivotal rotation of the first connection part 91' and the second connection part 92' occurs. A movement direction (i.e. the direction reverse to the direction denoted by an arrow on the seat plate 341 in FIG. 39) of the first latch 93' intersects the first pivotal plane, so that the first latch 93' can perform the locking and unlocking to the pivotal rotation of the first connection part 91' and the second connection part 92' in the intersection direction. In practice, a first pivotal axis is formed between the first connection part 91' and the second connection part 92'; that is, the first pivotal axis is the rotation center line around which the first connection part 91' and the second connection part 92' pivot relative to each other. The movement direction of the first latch 93' is parallel to the first pivotal axis. Preferably, the movement direction of the first latch 93' is shifted relative to the first pivotal axis; that is, a center line of the first latch 93' in the movement direction and the first pivotal axis are not located at the same line, so as to simplify the configuration of the first latch 93' relative to the first connection part 91' and the second connection part 92'. Furthermore, the first connection part 91' has a pivot hole 911'; correspondingly, the second connection part 92' includes a pivot shaft 921' matching with the pivot hole 911'. The pivot shaft 921' is inserted in coordination into the pivot hole 911' for achieving the pivotal rotation of the first connection part 91' and the second connection part 92', so that the pivotal connection of the first connection part 91' and the second connection part 92' is more simple and reliable. Certainly, by an actual requirement, it is practicable that the pivot hole 911' is disposed on the second connection part 92' while the pivot shaft 921' is disposed on the first connection part 91', which also can perform the pivotal connection of the first connection part 91' and the second connection part 92'.

Furthermore, the actuating mechanism 94' includes a first resilient part (not shown in the figures) urging against the first latch 93'. The first resilient part pushes the first latch 93' so that the first latch 93' has a tendency to move to the first locking position as shown by FIG. 35, 36, 37 or 38. In practice, in the embodiment, the first resilient part is disposed inside the second connection part 92' and resiliently compressed between the second connection part 92' and the first latch 93'. The first connection part 91' has a first engaging slot 912' for inserting the first latch 93', so that the locking to the pivotal rotation of the first connection part 91' and the second connection part 92' is simpler and more reliable. Certainly, by an actual requirement, it is practicable that the second connection part 92' has the engaging slot for inserting the first latch 93', or each of the first connection part 91' and the second connection part 92' has the engaging slot for inserting the first latch 93', which also can perform locking and unlocking by the first latch 93' to the pivotal rotation of the first connection part 91' and the second connection part 92'; therefore, the invention is not limited thereto.

Figure 38:
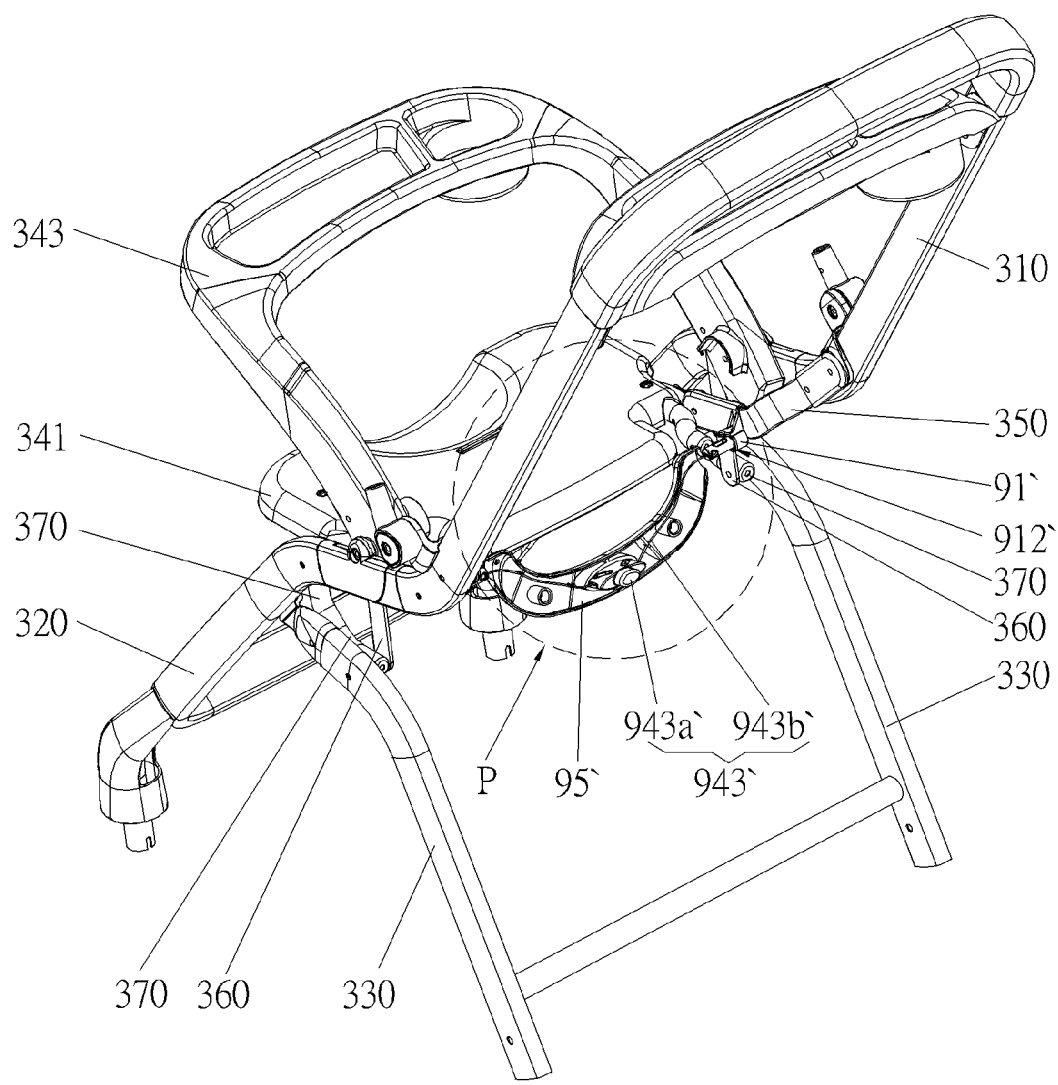
FIG. 38 is a perspective view of the stroller in FIG. 37 with removing some structural members.

Furthermore, as shown by FIG. 38, the actuating mechanism 94' further includes a first button component 943' connected to the first latch 93'. Preferably, the first button component 943' is connected to the first latch 93' remotely. The first button component 943' includes a first button 943a' and a first linking part 943b' connected to the first button 943a'. The first button 943a' can be pressed (e.g. in the front-to-rear direction of FIG. 39) to drive the first linking part 943b' to pull the first latch 93' to move, for convenience of a user to operate in a distance from the first latch 93'. Therein, for convenience of the installation of the first button component 943', the joint device 90' of the embodiment further includes a supporting part 95' fixedly connected to the second connection part 92'. The first button 943a' is movably disposed on the supporting part 95' and includes a first button driving part 9431'. Preferably, the first button driving part 9431' is a slanted sliding slot, for simplifying the structure of the first button driving part 9431'. The extension plane of the first button driving part 9431' intersects the movement direction of the first latch 93'. The first linking part 943b' includes a first linking follower 9432' matching with the first button driving part 9431'. Preferably, the first linking follower 9432' is a post structure, for simplifying the structure of the first linking follower 9432'. The post structure is disposed to pass through the slanted sliding slot with a gap therebetween. The first button driving part 9431' can be pressed to drive the first linking follower 9432' so that the first button 943a' moves the first latch 93' by the first linking part 943b' better.

On an association of FIGS. 35 through 39, the unfolding and folding of the stroller 300 equipped with the joint device 90' of the fourth embodiment will be described in detail in the following. When the stroller 300 is required to be folded, the first button 943a' is first to be pressed in the front-to-rear direction of FIG. 39 such that the first button 943a' slides on the supporting part 95'. By the cooperation of the first button driving part 9431' and the first linking follower 9432', the sliding first button 943a' drives the first latch 93' to move in the direction for disengaging from the first connection part 91', so that the first latch 93' is disengaged from the first connection part 91' so as to permit the pivotal rotation of the first connection part 91' and the second connection part 92'.

By the above operation steps, the joint device 90' of the embodiment is transferred from the locking status to the unlocking status. Afterward, under the condition of the first button 943a' being pressed, the supporting part 95' can be pulled upward to drive the seat tube 342 to rotate. A rear end portion of the seat tube 342 drives the stroller handle 310 to be folded through the second linking parts 360. Two front end portions of the seat tube 342 drives the supporting legs 330 to be folded through the third linking parts 370. The folding of the frame of the stroller 300 is therefore achieved. During the above folding process, the second linking part 360 drives the seat mechanism 340 to be folded synchronously. Therefore, the purpose of folding the stroller 300 is achieved.

Because the first latches 13, 84, 93 and 93' can be selectively moved to the first locking position of locking the two connection parts 11, 12, 81, 82, 91, 92, 91' and 92' or the first unlocking position of unlocking the two connection parts 11, 12, 81, 82, 91, 92, 91' and 92'. The actuating mechanisms 14, 83, 94 and 94' are disposed adjacent to where the two connection parts 11, 12, 81, 82, 91, 92, 91' and 92' are pivotally connected. The actuating mechanisms 14, 83, 94 and 94' are connected to the first latches 13, 84, 93 and 93' to be operable to move the first latches 13, 84, 93 and 93' to the first locking position or the first unlocking position. So when the two connection parts 11, 12, 81, 82, 91, 92, 91' and 92' are required to be rotated to each other, it is practicable to move the first latches 13, 84, 93 and 93' to the first unlocking position. When the two connection parts 11, 12, 81, 82, 91, 92, 91' and 92' are required to be locked after rotating, it is practicable to move the first latches 13, 84, 93 and 93' to the first locking position. Therefore, the joint devices 10, 80, 90 and 90' of the invention facilitate the unfolding and folding operation of the strollers 100, 100', 100" and 300 and have the advantage of simple structure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A joint device, comprising:
    two connection parts pivotally connected to each other;
    a first latch capable of being selectively moved to a first locking position for locking the two connection parts or a first unlocking position for unlocking the two connection parts, wherein a first pivotal axis is formed between the two connection parts, and a movement direction of the first latch is parallel to the first pivotal axis, wherein one of the two connection parts has a first engaging slot, and the first latch is inserted into the first engaging slot in the first locking position; and
    an actuating mechanism disposed adjacent to where the two connection parts are pivotally connected, the actuating mechanism being connected to the first latch to be operable to selectively move the first latch to the first locking position or the first unlocking position, the actuating mechanism comprising:
        a handle pivotally connected to one of the two connection parts;
        a second latch selectively locking the handle with the one of the two connection parts, wherein the handle is selectively locked by the second latch, and only when the second latch is released can the first latch be released by rotation of the handle; and
        an operation part having an operation driving part and a second engaging slot monolithically formed on the operation part, the movement direction of the first latch being co-linear with a location of the operation driving part, a movement direction of the second latch being co-linear with a location of the second engaging slot, and the second latch being slidably inserted in the second engaging slot, wherein the movement direction of the first latch and the movement direction of the second latch are parallel and not co-linear, and a location of the operation part is substantially level with a location at which the two connection parts are pivotally connected together.

2. The joint device of claim 1, wherein one of the two connection parts has a pivot hole, and the other one of the two connection parts has a pivot shaft inserted into the pivot hole.

3. The joint device of claim 1, wherein a first pivotal plane is formed between the two connection parts, and the movement direction of the first latch intersects the first pivotal plane.

4. The joint device of claim 1, wherein when the first latch is located at the first locking position, the first latch is engaged with the two connection parts.

5. The joint device of claim 1, wherein when the first latch is located at the first locking position, one of the two connection parts is held between the first latch and the other one of the two connection parts.

6. The joint device of claim 1, wherein when the first latch is located at the first unlocking position, the first latch is disengaged from one of the two connection parts.

7. The joint device of claim 1, wherein the actuating mechanism comprises a first resilient part urging against the first latch, and the first resilient part pushes the first latch so that the first latch has a tendency to move to the first locking position.

8. The joint device of claim 7, wherein the actuating mechanism further comprises a first pushing part, and the first pushing part is operable to push the first latch so that the first latch moves to the first unlocking position.

9. The joint device of claim 8, further comprising a supporting part fixedly connected to one of the two connection parts, the first pushing part being slidably connected to the supporting part, a movement direction of the first pushing part being parallel to the movement direction of the first latch.

10. The joint device of claim 9, wherein one of the first pushing part and the supporting part has a guiding slot, the other one of the first pushing part and the supporting part has a guiding post slidably connected to the guiding slot, and an extension direction of the guiding slot is parallel to the movement direction of the first latch.

11. The joint device of claim 9, wherein the actuating mechanism further comprises the operation part pivotally connected to the supporting part, the operation part comprises the operation driving part, the first pushing part comprises a pushing follower in coordination with the operation driving part, and the operation driving part is capable of rotating to drive the pushing follower to move so that the first pushing part slides to push the first latch.

12. The joint device of claim 11, wherein the second latch is capable of being selectively moved to a second locking position of locking one of the two connection parts and the operation part or a second unlocking position of unlocking one of the two connection parts and the operation part.

13. The joint device of claim 12, wherein a second pivotal plane is formed between the supporting part and the operation part, and the movement direction of the second latch intersects the second pivotal plane.

14. The joint device of claim 12, wherein a second pivotal axis is formed between the supporting part and the operation part, and the movement direction of the second latch is parallel to the second pivotal axis.

15. The joint device of claim 12, wherein when the second latch is located at the second locking position, the second latch is engaged with one of the two connection parts and the operation part, and when the second latch is located at the second unlocking position, the second latch is disengaged from one of the two connection parts.

16. The joint device of claim 12, wherein the actuating mechanism further comprises a second resilient part urging against the second latch, and the second resilient part pushes the second latch so that the second latch has a tendency to move to the second locking position.

17. The joint device of claim 16, wherein the actuating mechanism further comprises a second pushing part, and the second pushing part is operable to push the second latch so that the second latch moves to the second unlocking position.

18. The joint device of claim 17, wherein the actuating mechanism further comprises a button component connected to the second pushing part, the second button component comprises a button and a linking part connecting the button and the second pushing part, and the button is capable of being pressed to drive the linking part to pull the second pushing part so that the second pushing part slides to push the second latch.

19. The joint device of claim 18, wherein the button is movably disposed on the operation part and comprises a button driving part, the linking part comprises a second linking follower in coordination with the button driving part, and the button driving part is capable of being pressed to drive the second linking follower.

20. The joint device of claim 16, wherein the actuating mechanism further comprises a button component connected to the second latch, the button component comprises a button and a linking part connected to the button, and the button is capable of being pressed to drive the linking part to pull the second latch.

21. The joint device of claim 1, wherein both the first latch and the second latch are disposed on a same one of the two connection parts.

22. The joint device of claim 1, wherein both the first latch and the second latch are disposed on the handle.

23. The joint device of claim 22, wherein the handle comprises the operation part, and the first latch and the second latch are each independently disposed on the operation part.

24. The joint device of claim 1, wherein the movement direction of the second latch is parallel to the first pivotal axis.

25. The joint device of claim 1, wherein a button is slidably disposed on the handle for releasing the second latch.

* * * * *